US008706332B2

(12) United States Patent  
Kume et al.

(10) Patent No.: US 8,706,332 B2  
(45) Date of Patent: Apr. 22, 2014

(54) ELECTRIC VEHICLE AND METHOD OF CONTROLLING THE SAME
(75) Inventors: Yohei Kume, Osaka (JP); Hideo Kawakami, Osaka (JP); Tohru Nakamura, Osaka (JP)
(73) Assignee: Panasonic Corporation, Osaka (JP)
( * ) Notice: Subject to any disclaimer, the term of this patent is extended or adjusted under 35 U.S.C. 154(b) by 189 days.
(21) Appl. No.: 13/146,097
(22) PCT Filed: May 27, 2010
(86) PCT No.: PCT/JP2010/003555
§ 371 (c)(1),
(2), (4) Date: Jul. 25, 2011
(87) PCT Pub. No.: WO2010/140321
PCT Pub. Date: Dec. 9, 2010
(65) Prior Publication Data
US 2011/0313604 A1 Dec. 22, 2011
(30) Foreign Application Priority Data
Jun. 2, 2009 (JP) .................................. 2009-132812
(51) Int. Cl.
*B60L 9/00* (2006.01)
*B60W 20/00* (2006.01)
(52) U.S. Cl.
CPC .................................... *B60W 20/00* (2013.01)
USPC .............................. 701/22; 180/6.5; 180/19.3
(58) Field of Classification Search
CPC ................................................... B60W 20/00
USPC ..................................... 701/22; 180/6.5, 19.3
See application file for complete search history.
(56) References Cited
U.S. PATENT DOCUMENTS
5,431,607 A 7/1995 Alder et al.
(Continued)

FOREIGN PATENT DOCUMENTS

CN 1072891 6/1993
EP 0 694 432 1/1996
(Continued)

OTHER PUBLICATIONS

International Search Report issued Sep. 7, 2010 in corresponding International Application No. PCT/JP2010/003555.
(Continued)

*Primary Examiner* — Helal A Algahaim
*Assistant Examiner* — Nga X Nguyen
(74) *Attorney, Agent, or Firm* — Wenderoth, Lind & Ponack, L.L.P.

(57) ABSTRACT

The present invention has an object of providing an electric vehicle which makes an assisting movement based on an operation by an operator without making a movement when an operator is not operating the electric vehicle or a movement which widely differs from a movement intended by the operator in direction or distance, and a method of controlling the electric vehicle. The electric vehicle (1) includes an operating force measurement unit (4) which measures an operating force applied by an operator (13) to the electric vehicle (1), an obstacle measurement unit (8) which measures a distance and a direction from the electric vehicle (1) to an obstacle, a virtual repulsive force calculation unit (9) which calculates a virtual repulsive force having a magnitude inversely proportional to a magnitude of the distance measured by the obstacle measurement unit (8) and a direction opposite to the direction to the obstacle, and an assisting force calculation unit (10) which calculates an assisting force for moving the electric vehicle (1) based on a resultant force of the operating force and the virtual repulsive force. The assisting force calculation unit (10) has an upper limit X to a magnitude of the calculated assisting force, and sets the upper limit X based on a magnitude of the operating force and an angle between a direction of the operating force and a direction of the resultant force.

8 Claims, 26 Drawing Sheets

(56) References Cited

U.S. PATENT DOCUMENTS

| | | | |
|---|---|---|---|
| 5,461,357 A * | 10/1995 | Yoshioka et al. | 340/435 |
| 5,657,828 A | 8/1997 | Nagamachi | |
| 6,691,018 B1 | 2/2004 | Miyahara | |
| 2003/0218563 A1 | 11/2003 | Miyahara | |
| 2007/0041817 A1 | 2/2007 | Kakinuma | |
| 2011/0301845 A1 | 12/2011 | Harada | |

FOREIGN PATENT DOCUMENTS

| | | |
|---|---|---|
| JP | 07110711 A * | 4/1995 |
| JP | 11-262111 | 9/1999 |
| JP | 2005-293154 | 10/2005 |
| JP | 2006-334082 | 12/2006 |
| JP | 2007-55480 | 3/2007 |
| JP | 2007-143788 | 6/2007 |
| JP | 2007-230411 | 9/2007 |
| JP | 2008-296900 | 12/2008 |
| WO | 2010/086895 | 8/2010 |

OTHER PUBLICATIONS

Extended European Search Report issued Jan. 9, 2014 in corresponding European Patent Application No. 10783109.1.

* cited by examiner

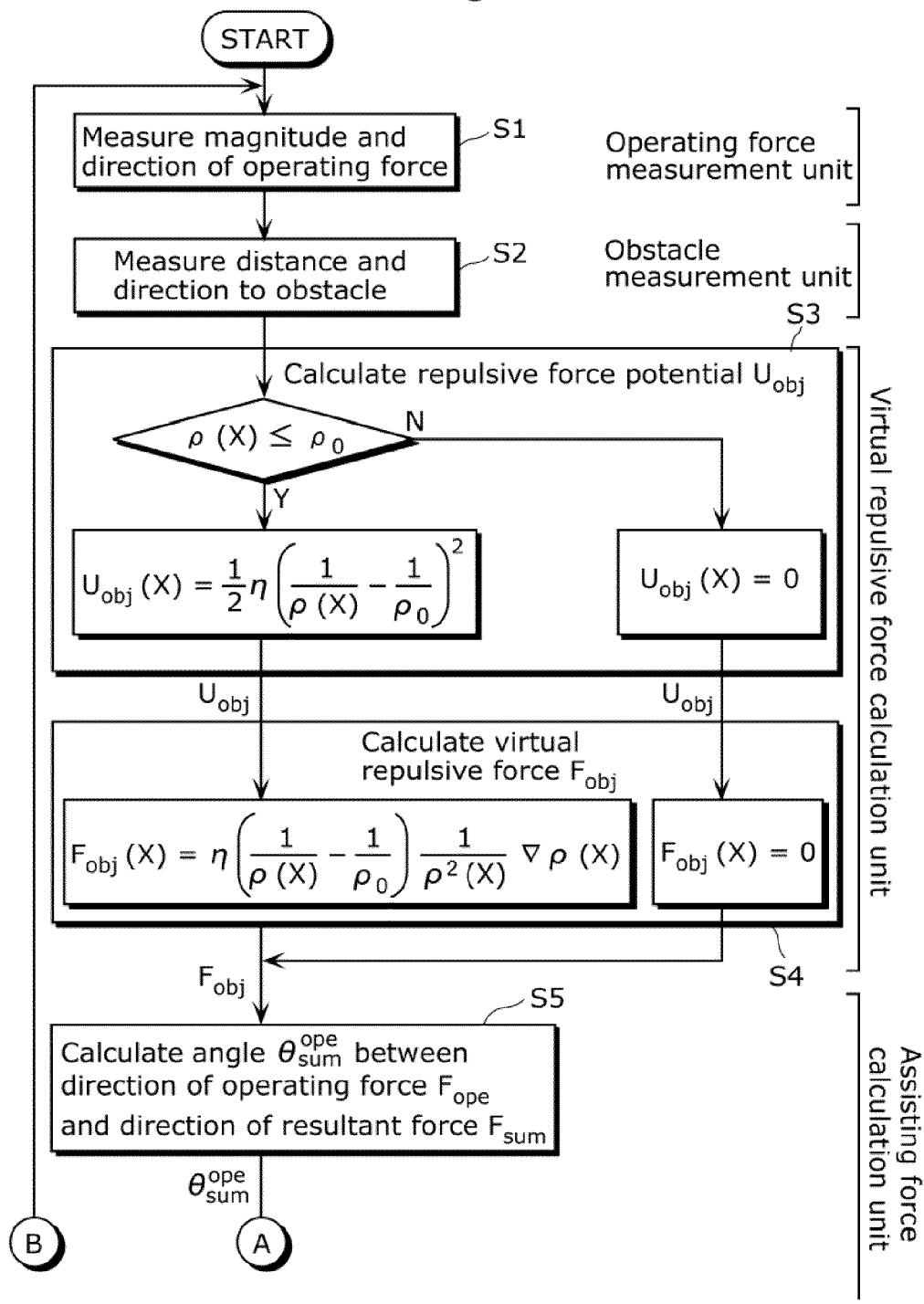

ELECTRIC VEHICLE AND METHOD OF CONTROLLING THE SAME

TECHNICAL FIELD

The present invention relates to electric vehicles which move under control of an operator, such as a power assisted trolley, an electric wheelchair, and an electric shopping cart, and methods of controlling the electric vehicles.

RELATED ART

Electric vehicles which move under control of an operator include power assisted electric vehicles featuring an obstacle avoidance function with which the electric vehicles avoid obstacles through a movement determined by calculation based on information provided from obstacle sensors installed in the electric vehicles. Among such electric vehicles, an electric vehicle has been presented which automatically avoids an obstacle while operating under control of an operator through a movement calculated by integrating a movement under control of an operator and a movement for avoiding an obstacle.

For example, a power assisted trolley has been presented as an electric vehicle with power assistance in Patent Literature 1. A power assisted trolley 205 is driven under control based on a virtual repulsive force 202 which acts in a direction opposite to a direction to an obstacle 204. The magnitude of the virtual repulsive force 202 is inversely proportional to a distance to the obstacle 204 detected by an obstacle sensor installed in the power assisted trolley 205. As shown in FIG. 23, the power assisted trolley 205 controls its driving force based on a resultant force 203 of an operating force 201 and the virtual repulsive force 202.

Here, the operating force 201 is a force applied to a handle unit 205a of the power assisted trolley by an operator 206, and the virtual repulsive force 202 is a force which acts in a direction opposite to a direction to an obstacle 204. In this configuration, the power assisted trolley 205 moves on the basis of the operating force 201 applied by the operator 206 while automatically avoiding the obstacle.

CITATION LIST

Patent Literature

[PTL 1] Japanese Unexamined Patent Application Publication Number 2007-55480

SUMMARY OF INVENTION

The electric vehicle according to an aspect of the present invention includes: an operating force measurement unit configured to measure an operating force applied by an operator to the electric vehicle; an obstacle measurement unit configured to measure a position vector of an obstacle in relation to the electric vehicle as an origin; a virtual repulsive force calculation unit configured to calculate a virtual repulsive force which has a magnitude inversely proportional to a magnitude of the position vector and a direction opposite to a direction of the position vector; and an assisting force calculation unit configured to (i) calculate an assisting force for moving the electric vehicle based on a resultant force of the operating force and the virtual repulsive force, (ii) calculate an upper limit X to a magnitude of the calculated assisting force based on the operating force, (iii) and output information on an assisting force equal to or smaller than the upper limit X when the calculated assisting force exceeds the upper limit X.

Furthermore, in order to solve the problem, the electric vehicle according to another aspect of the present invention includes: a control input measurement unit configured to measure a magnitude and a direction of a control input provided by an operator to the electric vehicle; an obstacle measurement unit configured to measure a position vector of an obstacle in relation to the electric vehicle as an origin; a target movement velocity calculation unit configured to calculate a target movement velocity of the electric vehicle, the target movement velocity being based on the magnitude and direction of the control input measured by the control input measurement unit; an obstacle avoidance velocity calculation unit configured to calculate, based on the position vector determined by the obstacle measurement unit, an obstacle avoidance velocity at which the electric vehicle is moved away from the obstacle; and an assisting movement velocity calculation unit configured to (i) calculate an assisting movement velocity for moving the electric vehicle based on a net velocity of the target movement velocity and the obstacle avoidance velocity, (ii) calculate an upper limit Y to a magnitude of the calculated assisting movement velocity based on the target movement velocity, (iii) and output information on an assisting movement velocity equal to or smaller than the upper limit Y when the calculated assisting movement velocity exceeds the upper limit.

BRIEF DESCRIPTION OF DRAWINGS

FIG. 4A is a first half of a flowchart of the power assisted trolley 1 according to Embodiment 1.

DESCRIPTION OF EMBODIMENTS

Figure 1:
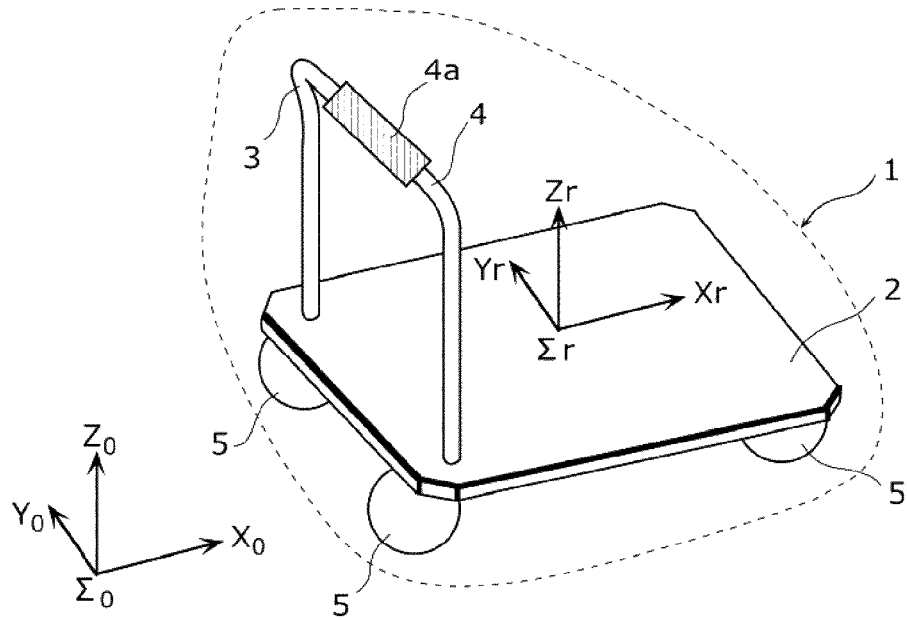
FIG. 1 illustrates a perspective view of a power assisted trolley 1 according to Embodiment 1.

The following describes embodiments of the present invention. The present invention is not limited to the embodiments described herein for illustrative purposes, and variations and modifications of the embodiments may be made within the scope of the present invention as long as conceivable to those skilled in the art. It is to be noted that the same components are denoted with the same reference numerals and the descriptions thereof are omitted.

Embodiment 1

Figure 2:
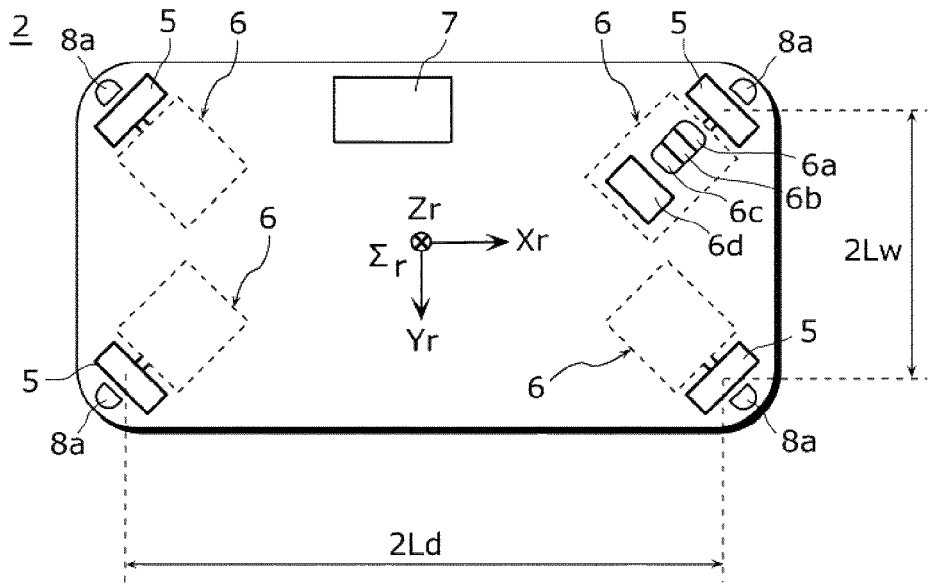
FIG. 2 illustrates a bottom view of the power assisted trolley 1 according to Embodiment 1.

FIG. 1 illustrates a perspective view of a power assisted trolley 1 according to Embodiment 1 of the present invention, and FIG. 2 illustrates a bottom view of the power assisted trolley 1 according to Embodiment 1.

For ease of understanding, a trolley coordinate system $\Sigma_r$ is provided to the power assisted trolley 1. The trolley coordinate system $\Sigma_r$ is fixed to the power assisted trolley 1 and moves together with the movement of the power assisted trolley 1 (see FIG. 1). The trolley coordinate system $\Sigma_r$ has three axes of an $X_r$-axis, a $Y_r$-axis, and a $Z_r$-axis orthogonal to each other. An $X_r$-$Y_r$ plane of the trolley coordinate system $\Sigma_r$ is a horizontal plane parallel to the ground. The $X_r$-axis extends in the direction toward the front of the power assisted trolley 1.

On the other hand, a reference coordinate system $\Sigma_0$ is provided in order to indicate the position of the power assisted trolley 1, which is an electric vehicle. The reference coordinate system $\Sigma_o$ has three axes of an $X_0$-axis, a $Y_0$-axis, and a $Z_0$-axis orthogonal to each other. The $X_0$-$Y_0$ plane of the reference coordinate system $\Sigma_0$ is set on the ground along which the power assisted trolley 1 travels. The position and orientation of the power assisted trolley 1 are defined using the trolley coordinate system $\Sigma_r$ and the reference coordinate system $\Sigma_0$.

The power assisted trolley 1 has a platform 2 on which an object (not shown) is placed. The trolley coordinate system $\Sigma_r$ has an origin at the center of the platform 2 (the center of four wheels 5).

A handle 3, which is a tubular frame formed into a portal shape, is provided at the rear end of the upper side of the platform 2. Provided at the middle of the handle 3 is an operating force measurement unit 4 which measures the magnitude and direction (in the trolley coordinate system $\Sigma_r$) of an operating force applied by an operator (not shown) to the handle 3. Hereinafter in Description and Claims, the term "operating force" is used to mean both a force (a vector having a magnitude and a direction) and a moment.

The operating force measurement unit 4 may be anything which is capable of measuring operating forces applied by the operator to the handle 3, such as a commercially available triaxial force sensor. Operating forces measured by the operating force measurement unit 4 includes forces in the $X_r$-axis direction and the $Y_r$-axis direction of the trolley coordinate system $\Sigma_r$, and a moment about the $\Sigma_r$-axis thereof.

The power assisted trolley 1 has wheels 5 positioned at the four corners of the lower surface of the platform 2 so as to allow the power assisted trolley 1 to travel. The power assisted trolley 1 further has wheel driving units 6 which drive the respective four wheels 5, and a controller 7 which controls the four wheel driving units 6. Specific control laws of the controller 7 is provided the power assisted trolley 1.

The wheels 5 preferably allow the power assisted trolley 1 to travel in all directions. In Embodiment 1, four omni wheels which are commercially available omni-directional wheels are used as the wheels 5. The positions and numbers of the wheels 5 may be determined as necessary. In Embodiment 1, the wheels are configured and disposed as shown in FIG. 2.

The power assisted trolley 1 may have an independent two-wheel drive configuration in which two commercially available pneumatic tires are used. In this case, several commercially available casters are preferably used as auxiliary wheels so that the power assisted trolley 1 are stably supported.

Each of the wheel driving unit 6 includes a reducer 6a, an electric motor 6b, an encoder 6c which measures a rotation angle of the electric motor 6b, and a servo driver 6d which drives the electric motor 6b. In Embodiment 1, the speed of the electric motor 6b is controlled so that it rotates at a speed specified by the controller 7.

The power assisted trolley 1 has an obstacle measurement unit 8 positioned on the lower surface side of the platform 2. The obstacle measurement units 8 measure a distance from the power assisted trolley 1 to an obstacle and a direction thereto. The obstacle measurement units 8 output information with reference to the trolley coordinate system $\Sigma_r$. For example, each of the obstacle measurement units 8 is a measurement device which obtains information on a position (direction) and a distance of an obstacle which is present within a horizontal range of 90 degrees or 180 degrees. In Embodiment 1, commercially available laser range sensors 8a are used as the obstacle measurement units 8 and provided at the four corners of the platform 2. In Embodiment 1, each of the laser range sensors 8a has a detection range of 270 degrees so that the laser range sensors 8a provided at the four corners of the platform 2 may measure a distance and a direction to an obstacle in all the directions from the power assisted trolley 1.

Figure 3:
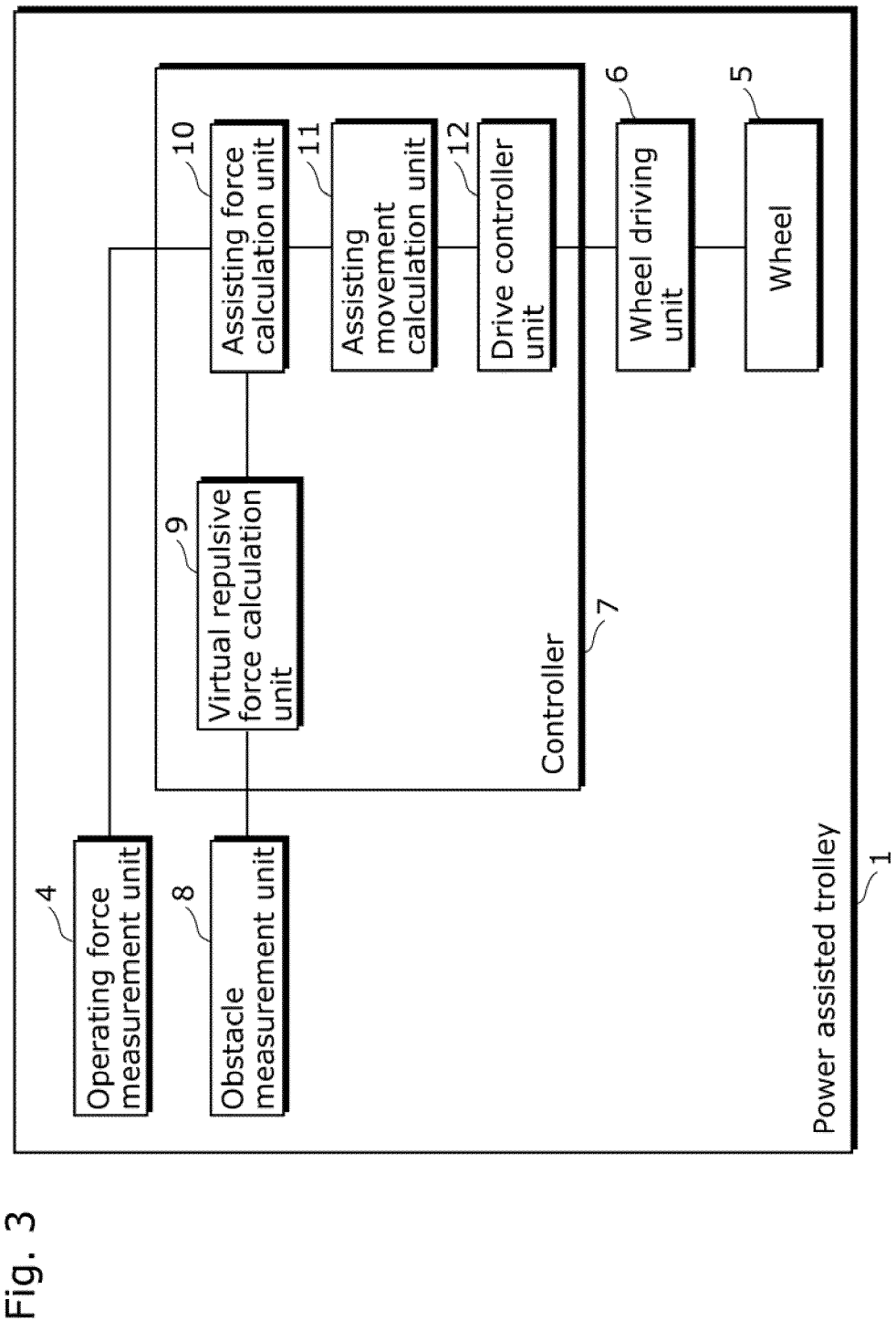
FIG. 3 is a block diagram showing a system configuration of the power assisted trolley 1 according to Embodiment 1.

FIG. 3 is a block diagram showing a system configuration of the power assisted trolley 1.

As shown in FIG. 3, the power assisted trolley 1 includes an operating force measurement unit 4, an obstacle measurement unit 8, a virtual repulsive force calculation unit 9, an assisting force calculation unit 10, an assisting movement calculation unit 11, a drive controller unit 12, a wheel driving unit 6, and a wheel 5 as functional units.

As described above, the operating force measurement unit 4 measures the magnitude and direction of an operating force applied by the operator 13 to the handle 3 of the power assisted trolley 1.

As described above, the obstacle measurement unit 8 measures the distance from the power assisted trolley 1 to the obstacle 14 and the direction thereto (a position vector of the obstacle 14 in relation to the power assisted trolley 1 as an origin).

The virtual repulsive force calculation unit 9 calculates a virtual repulsive force which has a magnitude inversely proportional to the distance to the obstacle 14 measured by the obstacle measurement unit 8 and acts in a direction opposite to the direction from the power assisted trolley 1 to the obstacle 14 (the direction of the position vector). The virtual repulsive force is information on a force to be applied to the power assisted trolley 1 in order to allow the power assisted trolley 1 to avoid a collision with the obstacle 14.

The assisting force calculation unit 10 calculates an assisting force for control of the power assisted trolley 1 from a resultant force of the operating force measured by the operating force measurement unit 4 and the virtual repulsive force calculated by the virtual repulsive force calculation unit 9, and provides information on the assisting force to the assisting movement calculation unit 11. Here, each of the virtual repulsive force and the assisting force is information with reference to the trolley coordinate system $\Sigma_r$.

The assisting movement calculation unit 11 calculates an assisting movement velocity of the power assisted trolley 1 on the basis of the assisting force calculated by the assisting force calculation unit 10 and provides information on the assisting movement velocity to the drive controller unit 12.

The drive controller unit 12 converts the assisting movement velocity calculated by the assisting movement calculation unit 11 into a rotation speed of the wheel 5 and provides an instruction regarding the rotation speed to the wheel driving unit 6.

The wheel driving unit 6 controls rotation of the wheel such that the wheel 5 rotates at the rotation speed resulting from the conversion by the drive controller unit 12.

In the configuration, the power assisted trolley 1 makes a movement based on the operation by the operator 13.

Here, the virtual repulsive force calculation unit 9, the assisting force calculation unit 10, the assisting movement calculation unit 11, and the drive controller unit 12 are implemented as, for example, a computing element and a program installed in the controller 7.

Figure 4B:
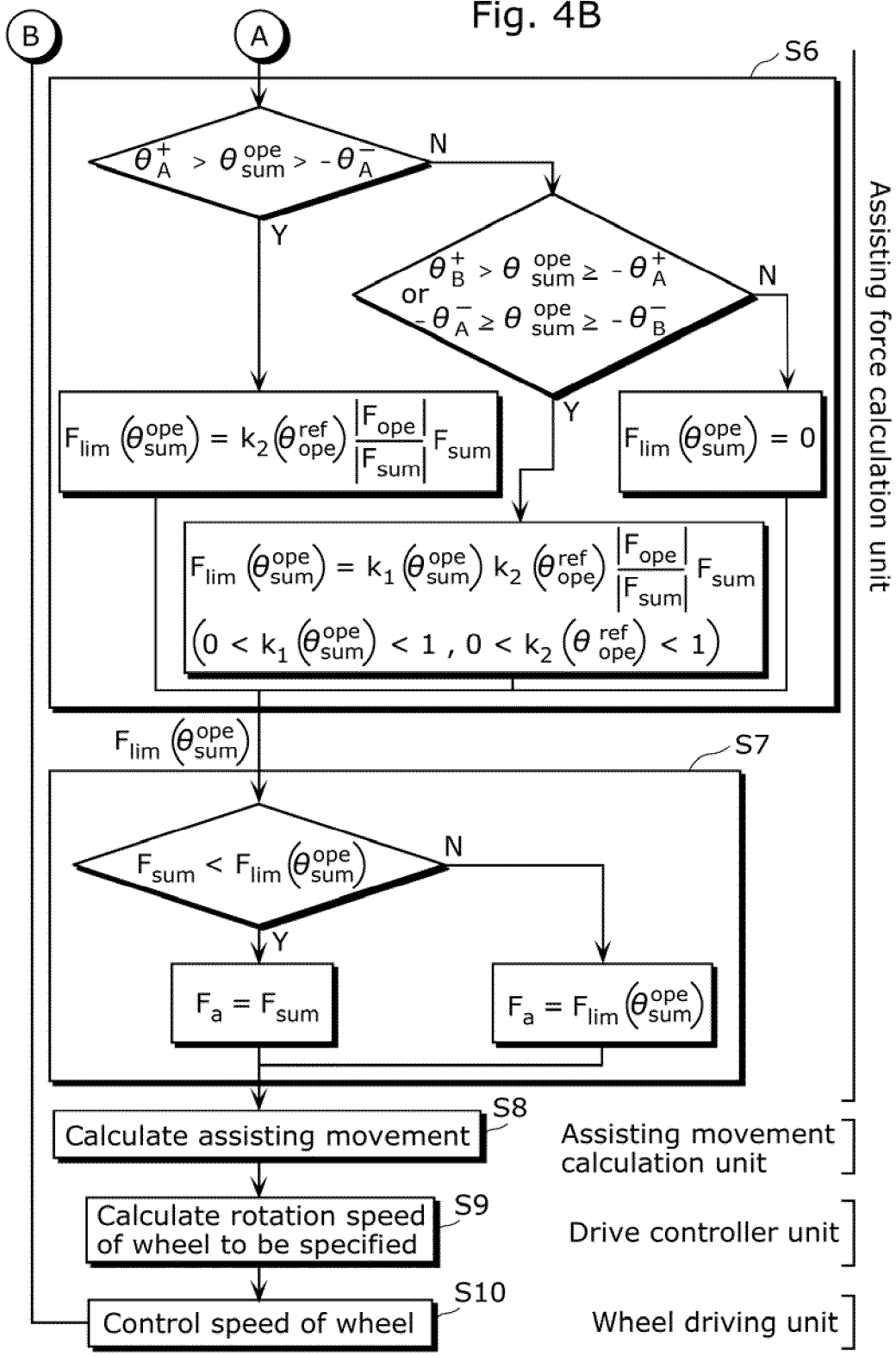
FIG. 4B is a second half of the flowchart of the power assisted trolley 1 according to Embodiment 1.

The following describes an example in which a specific control law is used in the configuration, with reference to a flowchart shown in FIG. 4.

First, the operating force measurement unit 4 measures, using (Eq. 1), the magnitude and direction of an operating force applied by the operator to the handle 3 (Step S1).

[Math. 1]

$$F_{ope} = [f_{ope}^x f_{ope}^y n_{ope}]^T \in R^3 \quad (\text{Eq. 1})$$

$f_{ope}^x$ denotes a force in the $X_r$-axis direction of the trolley coordinate system $\Sigma_r$. $f_{ope}^y$ denotes a force in the $Y_r$-axis direction of the trolley coordinate system $\Sigma_r$. $n_{ope}$ denotes a moment about the $Z_r$-axis of the trolley coordinate system $\Sigma_r$, where $n_{ope} \in R$. When no operating force is acting, the calculation is performed on the basis that the magnitude of the operating force is zero.

Next, the obstacle measurement unit 8 measures the distance from the power assisted trolley 1 to the obstacle and the direction thereto (a position vector) (Step S2).

Next, the virtual repulsive force calculation unit 9 calculates a virtual repulsive force for moving the power assisted trolley 1 away from the obstacle.

First, the virtual repulsive force calculation unit 9 calculates a repulsive force potential $U_{obj}(X)$ for the distance to the obstacle using (Eq. 2), where $U_{obj}(X) \in R$ (Step S3).

[Math. 2]

$$U_{obj}(X) = \begin{cases} \frac{1}{2}\eta\left(\frac{1}{\rho(X)} - \frac{1}{\rho_0}\right)^2 & (\text{if } \rho(X) \leq \rho_0) \\ 0 & (\text{if } \rho(X) > \rho_0) \end{cases} \quad (\text{Eq. 2})$$

Here, X denotes a vector representing a current position of the power assisted trolley 1, where $X=[x\ y\ \theta]^T \in R^3$. $\eta$ denotes a positive weighting factor, where $\eta \in R$. $\rho(X)$ denotes a distance of closest approach from X to the obstacle, where $\rho(X) \in R$. $\rho_0$ denotes a positive constant, where $\rho_0(X) \in R$. The repulsive force potential $U_{obj}(X)$, which is equal to or greater than zero, increases toward infinity as the power assisted trolley 1 comes closer to a region where the obstacle is present, and is zero when the distance from the power assisted trolley 1 to the obstacle is equal to or longer than $\rho_0$.

Next, $F_{obj}$, which denotes a virtual repulsive force to act on the power assisted trolley 1, is calculated using (Eq. 3) from the repulsive force potential calculated using (Eq. 2), where $F_{obj}^T \in R^3$ (Step S4).

[Math. 3]

$$F_{obj} = [f_{obj}^x\ f_{obj}^y\ n_{obj}] = -\nabla U_{obj}(X) = -\begin{bmatrix} \frac{\partial U_{obj}(X)}{\partial x} \\ \frac{\partial U_{obj}(X)}{\partial y} \\ \frac{\partial U_{obj}(X)}{\partial \theta} \end{bmatrix} \quad (\text{Eq. 3})$$

Here, $\nabla U_{obj}(X)$ denotes a gradient vector of $U_{obj}(X)$ at the current position X of the power assisted trolley 1. From (Eq. 2) and (Eq. 3), the virtual repulsive force for the current position X of the power assisted trolley 1 is represented by (Eq. 4).

[Math. 4]

$$F_{obj} = \begin{cases} \eta\left(\frac{1}{\rho(X)} - \frac{1}{\rho_0}\right)\frac{1}{\rho^2(X)}\nabla\rho(X) & (\text{if } \rho(X) \leq \rho_0) \\ 0 & (\text{if } \rho(X) > \rho_0) \end{cases} \quad (\text{Eq. 4})$$

The resultant virtual repulsive force is a virtual force which has a magnitude inversely proportional to the distance to the obstacle 14 and acts in the direction opposite to the direction to the obstacle 14 (the direction of the position vector). The virtual repulsive force moves the power assisted trolley 1 away from the obstacle 14.

Here, a resultant force $F_{sum}$ of the operating force $F_{ope}$ and the virtual repulsive force $F_{obj}$ is represented by (Eq. 5), where $F_{sum} = [f_{sum}^x\ f_{sum}^y\ n_{sum}]^T \in R^3$.

[Math. 5]

$$F_{sum} = F_{ope} + F_{obj} = \begin{bmatrix} f_{ope}^x + f_{obj}^x \\ f_{ope}^y + f_{obj}^y \\ n_{ope} + n_{obj} \end{bmatrix} \quad (\text{Eq. 5})$$

Here, in the conventional technique, the resultant force $F_{sum}$ is set to be the assisting force $F_a$, and the power assisted trolley 1 is moved by the assisting force $F_a$ ($=F_{ope}+F_{obj}$), where $F_a=[f^x_a \ f^y_a \ n_a]^T$ denotes the assisting force. However, as described above, the power-assisted trolley using the conventional technique may unexpectedly move without an operation by the operator or make a movement widely different from a movement intended by the operator in direction or magnitude, depending on the magnitude or direction of the virtual repulsive force. In this manner, the conventional technique may cause a safety problem. In order to solve the problem, in the present invention, the assisting force calculation unit 10 determines the magnitude of the assisting force $F_a$ on the basis of the operating force $F_{ope}$ applied by the operator 13 to the power assisted trolley 1. Specifically, the assisting force calculation unit 10 calculates the assisting force $F_a$ using (Eq. 6) (Step S7).

[Math. 6]

$$F_o = \begin{cases} F_{sum} & (\text{if } F_{sum} \leq F_{lim}(\theta^{ope}_{sum})) \\ F_{lim}(\theta^{ope}_{sum}) & (\text{if } F_{sum} > F_{lim}(\theta^{ope}_{sum})) \end{cases} \quad (\text{Eq. 6})$$

Here, $F_{lim}(\theta^{ope}_{sum})$ denotes an upper limit X of the assisting force $F_a$, and is defined on the basis of an angle $\theta^{ope}_{sum}$ between the direction of the operating force $F_{ope}$ and the direction of the resultant force $F_{sum}$ (=the operating force $F_{ope}$+the virtual repulsive force $F_{obj}$), where $F_{lim}(\theta^{ope}_{sum}) \in R$, and $\theta^{ope}_{sum} \in R$ (Step S5).

In Embodiment 1, curves shown in FIG. 5 to FIG. 8 are provided as an example of $F_{lim}(\theta^{ope}_{sum})$, which is the upper limit X of the assisting force $F_a$ (Step S6). As shown in FIG. 5 to FIG. 8, $F_{lim}(\theta^{ope}_{sum})$, which is the upper limit X of the assisting force $F_a$, is set to be equal to the magnitude of the operating force $F_{ope}$ when the angle $\theta^{ope}_{sum}$ between the direction of the operating force $F_{ope}$ and the direction of the resultant force $F_{sum}$ is within a predetermined angular range A ($\theta^+_A > \theta^{ope}_{sum} > -\theta^+_A$). On the other hand, when the angle $\theta^{ope}_{sum}$ between the direction of the operating force $F_{ope}$ and the direction of the resultant force $F_{sum}$ is within a predetermined angular range B ($\theta^+_B > \theta^{ope}_{sum} \geq \theta^+_A$ or $-\theta^-_A > \theta^{ope}_{sum} > -\theta^-_B$), $F_{lim}(\theta^{ope}_{sum})$ is set so as to gradually decrease from the magnitude equal to that of the operating force $F_{ope}$ with an increase in $|\theta^{ope}_{sum}|$, which is the absolute value of the angle $\theta^{ope}_{sum}$ between the direction of the operating force $F_{ope}$ and the direction of the resultant force $F_{sum}$. In addition, $F_{lim}(\theta^{ope}_{sum})$, the upper limit X of the assisting force $F_a$, is set to zero when the angle $\theta^{ope}_{sum}$ between the direction of the operating force $F_{ope}$ and the direction of the resultant force $F_{sum}$ is within a predetermined angular range C ($\theta^{ope}_{sum} \geq \theta^+_B$ or $-\theta^{31}_B > \theta^{ope}_{sum}$).

Figure 5:
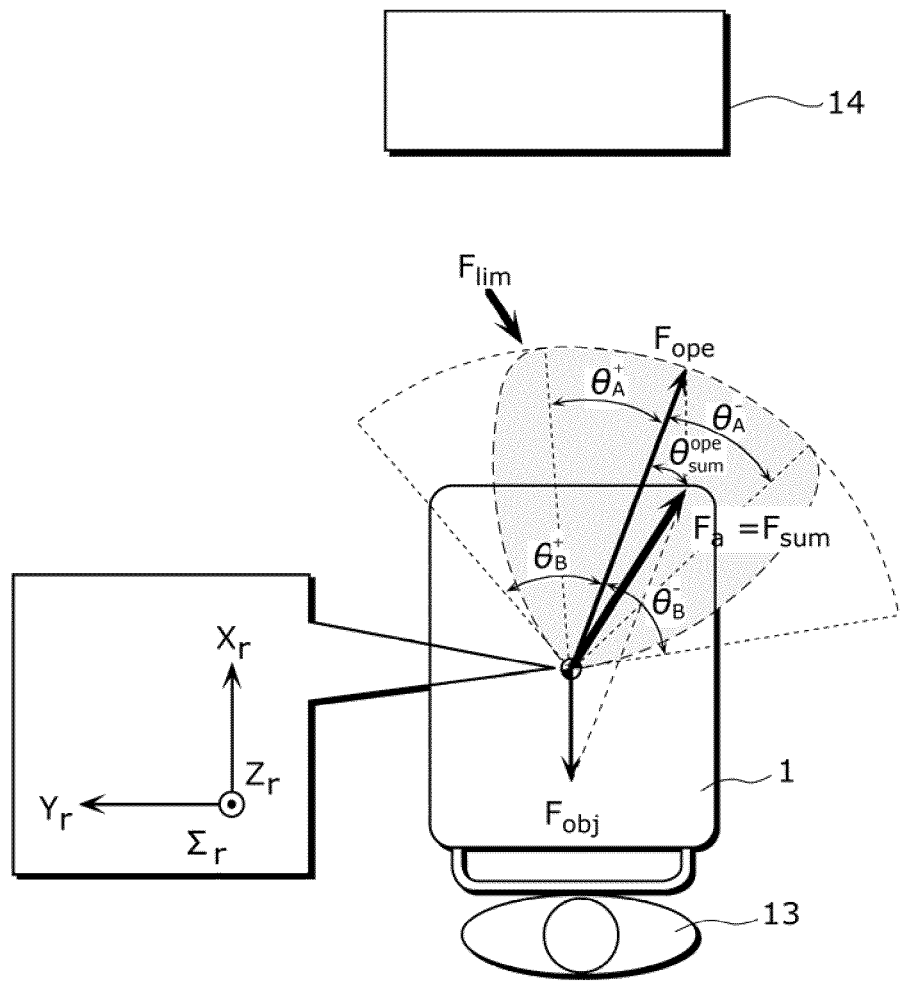
FIG. 5 shows an upper limit (1) to assisting force of the power assisted trolley 1 according to Embodiment 1.

FIG. 5 shows an example in which the assisting force $F_a$ is determined when the angle $\theta^{ope}_{sum}$ between the direction of the operating force $F_{ope}$ and the direction of the resultant force $F_{sum}$ is within the predetermined angular range A ($\theta^+_A > \theta^{ope}_{sum} > -\theta^-_A$) and the magnitude of the resultant force $F_{sum}$ is smaller than the upper limit X of the assisting force $F_a$.

Figure 6:
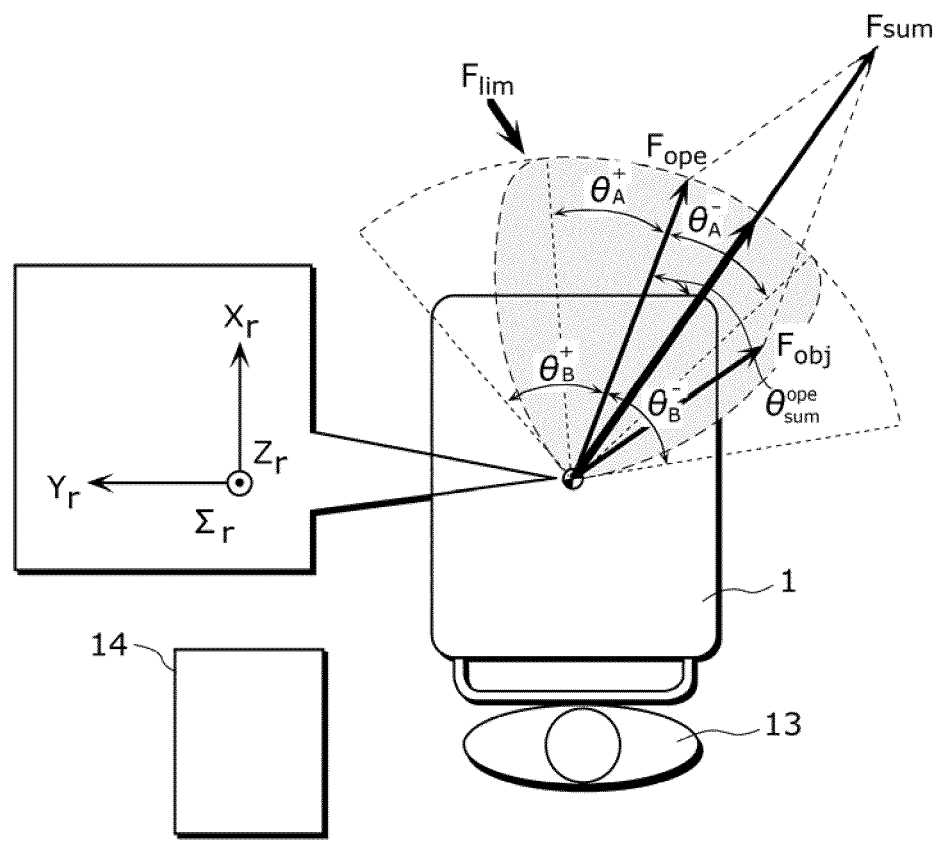
FIG. 6 shows an upper limit (2) to the assisting force of the power assisted trolley 1 according to Embodiment 1.

FIG. 6 shows an example in which the assisting force $F_a$ is determined when the angle $\theta^{ope}_{sum}$ between the direction of the operating force $F_{ope}$ and the direction of the resultant force $F_{sum}$ is within the predetermined angular range A ($\theta^+_A > \theta^{ope}_{sum} > -\theta^-_A$) and the magnitude of the resultant force $F_{sum}$ is greater than the upper limit X of the assisting force $F_a$.

Figure 7:
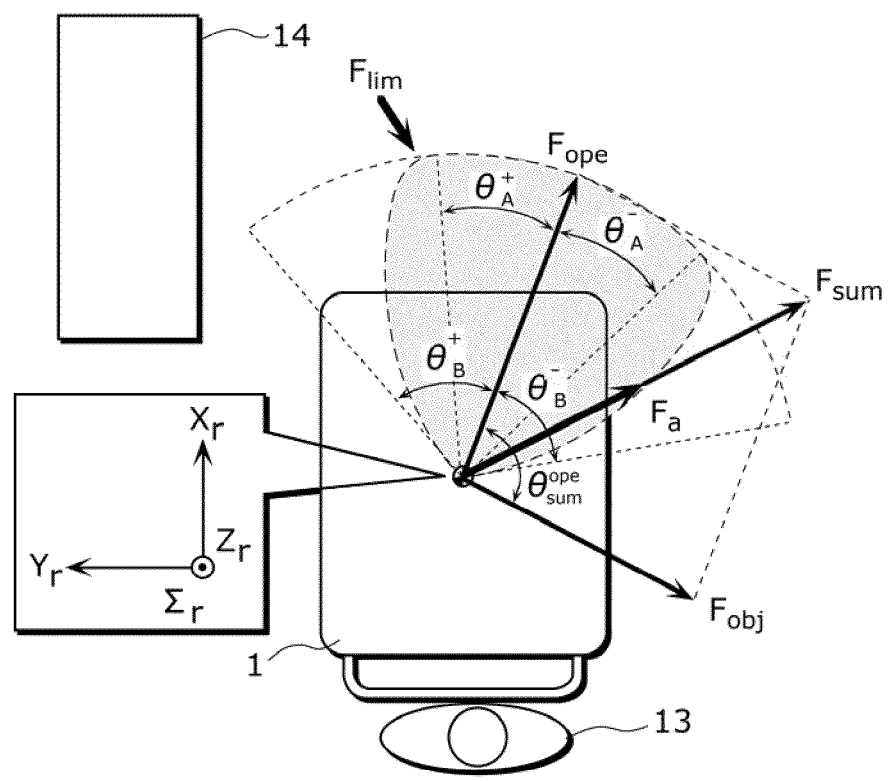
FIG. 7 shows an upper limit (3) to the assisting force of the power assisted trolley 1 according to Embodiment 1.

FIG. 7 shows an example in which the assisting force $F_a$ is determined when the angle $\theta^{ope}_{sum}$ between the direction of the operating force $F_{ope}$ and the direction of the resultant force $F_{sum}$ is within the predetermined angular range B ($\theta^+_B > \theta^{ope}_{sum} \geq \theta^+_A$ or $-\theta^-_A \geq \theta^{ope}_{sum} > -\theta^-_B$) and the magnitude of the resultant force $F_{sum}$ is greater than the upper limit X of the assisting force $F_a$.

Figure 8:
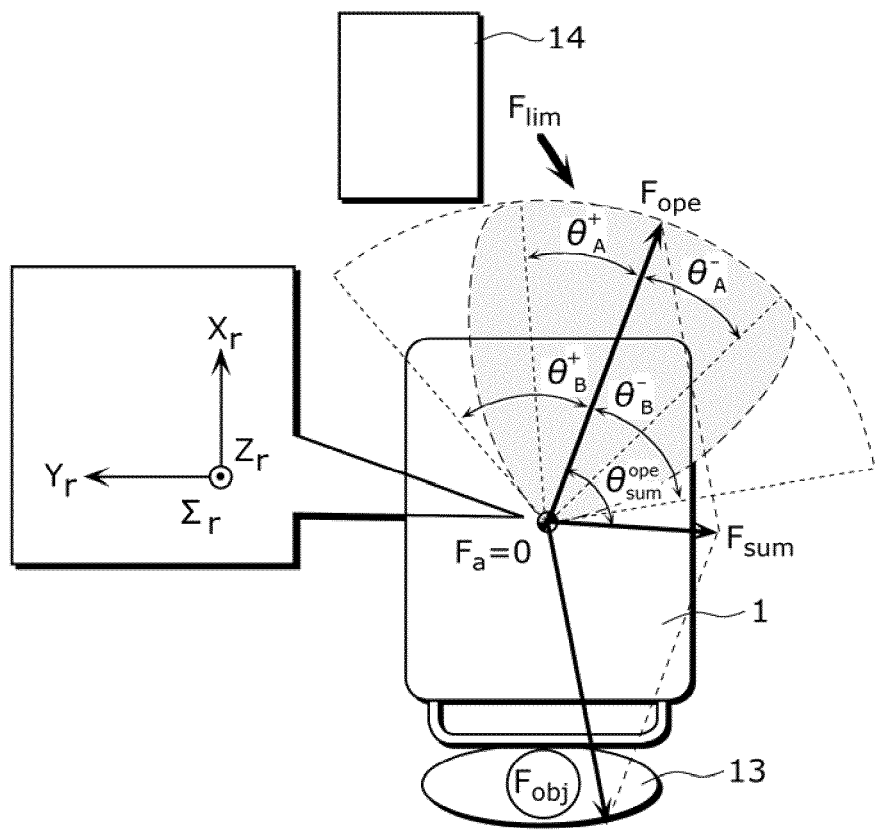
FIG. 8 shows an upper limit (4) to the assisting force of the power assisted trolley 1 according to Embodiment 1.

FIG. 8 shows an example in which the assisting force $F_a$ is determined when the angle $\theta^{ope}_{sum}$ between the direction of the operating force $F_{ope}$ and the direction of the resultant force $F_{sum}$ is within the predetermined angular range C ($\theta^{ope}_{sum} \geq \theta^+_B$ or $-\theta^-_B \geq \theta^{ope}_{sum}$).

The assisting force $F_a$ is defined as specifically shown below using (Eq. 7).

[Math. 7]

$$F_{lim}(\theta^{ope}_{sum}) = \qquad (\text{Eq. 7})$$

$$\begin{cases} \frac{|F_{ope}|}{|F_{sum}|} F_{sum} & (\text{if } \theta^+_A > \theta^{ope}_{sum} > -\theta^-_A) \\ k_1(\theta^{ope}_{sum}) \frac{|F_{ope}|}{|F_{sum}|} F_{sum} & (\text{if } \theta^+_B > \theta^{ope}_{sum} \geq \theta^+_A \text{ or } -\theta^-_A \geq \theta^{opr}_{sum} > -\theta^-_B) \\ 0 & (\text{if } \theta^{ope}_{sum} \geq \theta^+_B \text{ or } -\theta^-_B \geq \theta^{ope}_{sum}) \end{cases}$$

Here, $k_1(\theta^{ope}_{sum})$ denotes a parameter to change the upper limit of the assisting force $F_a$ and has a value defined on the basis of the angle $\theta^{ope}_{sum}$ between the direction of the operating force $F_{ope}$ and the direction of the resultant force $F_{sum}$, where $k_1(\theta^{ope}_{sum}) \in R$, and $0 < k_1(\theta^{ope}_{sum}) < 1$.

In Embodiment 1, $\theta^+_A$, $\theta^-_A$, $\theta^+_B$, and $\theta^-_B$, which define the angular ranges A to C, are assumed to be provided with the following specific values: $\theta^+_A = \theta^-_A = 30°$; and $\theta^+_B = \theta^-_B = 60°$. In this case, $F_{lim}(\theta^{ope}_{sum})$, which is the upper limit X of the assisting force $F_a$, is set to be equal to the magnitude of the operating force $F_{ope}$ when the angle $\theta^{ope}_{sum}$ between the direction of the operating force $F_{ope}$ and the direction of the resultant force $F_{sum}$ is relatively small ($30° > \theta^{ope}_{sum} > -30°$). On the other hand, when the angle $\theta^{ope}_{sum}$ between the direction of the operating force $F_{ope}$ and the direction of the resultant force $F_{sum}$ is relatively large ($60° > \theta^{ope}_{sum} \geq 30°$ or $-30° > \theta^{ope}_{sum} > -60°$), $F_{lim}(\theta^{ope}_{sum})$ is set so as to gradually decrease from the magnitude equal to that of the operating force $F_{ope}$ with an increase in $|\theta^{ope}_{sum}|$, which is the absolute value of the angle $\theta^{ope}_{sum}$ between the direction of the operating force $F_{ope}$ and the direction of the resultant force $F_{sum}$. In addition, $F_{lim}(\theta^{ope}_{sum})$, the upper limit X of the assisting force $F_a$, is set to zero when the angle $\theta^{ope}_{sum}$ between the direction of the operating force $F_{ope}$ and the direction of the resultant force $F_{sum}$ is very large ($\theta^{ope}_{sum} \geq 60°$ or $-60° \geq \theta^{ope}_{sum}$).

Setting the upper limit X of the assisting force $F_a$ in this manner produces the following advantageous effects.

First, when the angle $\theta^{ope}_{sum}$ between the direction of the operating force $F_{ope}$ and the direction of the resultant force $F_{sum}$ is within the predetermined angular range A ($30° > \theta^{ope}_{sum} > -30°$), that is, when the direction of an operation by the operator 13 (=the direction of the operating force $F_{ope}$) and the direction of an actual movement (=the direction of the resultant force $F_{sum}$) approximately coincide with each other, the assisting force $F_a$ generated has a magnitude expected by the operator 13 (=the magnitude of the operating force $F_{ope}$ applied by the operator 13). This causes the power assisted trolley 1 to make a movement intended by the operator 13. On the other hand, when the angle $\theta^{ope}_{sum}$ between the direction of the operating force $F_{ope}$ and the direction of the resultant force $F_{sum}$ is within the predetermined angular range B ($60° \geq \theta^{ope}_{sum} \geq 30°$ or $-30° \geq \theta^{ope}_{sum} > -60°$), that is, when the direction of an operation by the operator 13 (=the direction of the operating force $F_{ope}$) and the direction of an actual movement (=the direction of the resultant force $F_{sum}$) do not coincide with each other but the difference therebetween are within the predetermined angular range B ($60° > \theta^{ope}_{sum} \geq 30°$ or $-30° \geq \theta^{ope}_{sum} > -60°$), the assisting force $F_a$ is set so as to gradually decrease from the magnitude equal to that of the operating force $F_{ope}$ with an increase in $|\theta^{ope}_{sum}|$, which is the absolute value of the angle $\theta^{ope}_{sum}$ between the direction of the operating force $F_{ope}$ and the direction of the resultant force $F_{sum}$. In this configuration, the limitation to the assisting force increases as the difference between the direction of as movement intended by the operator 13 (=the direction of the operating force $F_{ope}$) and the direction of an actual movement (=the direction of the resultant force $F_{sum}$) becomes larger. As a result, unintended movements are less likely to be made, so that safety of operation of the power assisted trolley 1 is increased.

In addition, when the angle $\theta^{ope}_{sum}$ between the direction of the operating force $F_{ope}$ and the direction of the resultant force $F_{sum}$ is within the predetermined angular range C ($\theta^{ope}_{sum} \geq 60°$ or $-60° \geq \theta^{ope}_{sum}$), that is, when there is a large difference between the direction of a movement intended by the operator 13 (=the direction of the operating force $F_{ope}$) and the direction of an actual movement (=the direction of the resultant force $F_{sum}$), the assisting force generated has a magnitude of zero (that is, no movement is made).

In this configuration, no movement in the direction which is widely different from the direction intended by the operator 13 is made, and thus safety of operation of the power assisted trolley 1 is increased.

In addition, safety of operation of the power assisted trolley 1 may be further increased by changing the upper limit X of the assisting force $F_a$ on the basis of $\theta^{ref}_{ope}$, which denotes an angle between a reference direction set for the power assisted trolley 1 and the direction of the operating force $F_{ope}$, where $\theta^{ref}_{ope} \in R$. For example, when the power assisted trolley 1 is loaded with a large object, the operator 13 uses the power assisted trolley 1 by moving it backward (pulling) because the backward view of the operator 13 is clear and the forward view is blocked. In this case, a reference direction is set in the negative direction of the $X_r$-axis of the trolley coordinate system $\Sigma_r$. Then, the upper limit of the assisting force $F_a$ is modified on the basis of the angle $\theta^{ref}_{ope}$ between the reference direction (=the positive direction of the $X_r$-axis of the trolley coordinate system $\Sigma_r$) and the direction of the operating force $F_{ope}$. Specifically, the upper limit of the assisting force $F_a$ is set on the basis of (Eq. 8).

[Math 8]

$$F_{lim}(\theta^{ope}_{sum}) = \begin{cases} k_2(\theta^{ref}_{ope}) \frac{|F_{ope}|}{|F_{sum}|} F_{sum} & (\text{if } \theta^+_A > \theta^{ope}_{sum} > -\theta^-_A) \\ k_1(\theta^{ope}_{sum}) k_2(\theta^{ref}_{ope}) \frac{|F_{ope}|}{|F_{sum}|} F_{sum} & (\text{if } \theta^+_B > \theta^{ope}_{sum} \geq \theta^+_A \text{ or } -\theta^-_A \geq \theta^{ope}_{sum} > -\theta^-_B) \\ 0 & (\text{if } \theta^{ope}_{sum} \geq \theta^+_B \text{ or } -\theta^-_B \geq \theta^{ope}_{sum}) \end{cases} \quad (\text{Eq. 8})$$

Here, $k_2(\theta^{ref}_{ope})$ denotes a parameter to change the upper limit X of the assisting force $F_a$ and has a value defined on the basis of the angle $\theta^{ref}_{ope}$ between the set reference direction and the direction of the operating force $F_{ope}$, where $k_2(r^{ref}_{ope}) \in R$, and $0 < k_2(\theta^{ref}_{ope}) < 1$.

Figure 9:
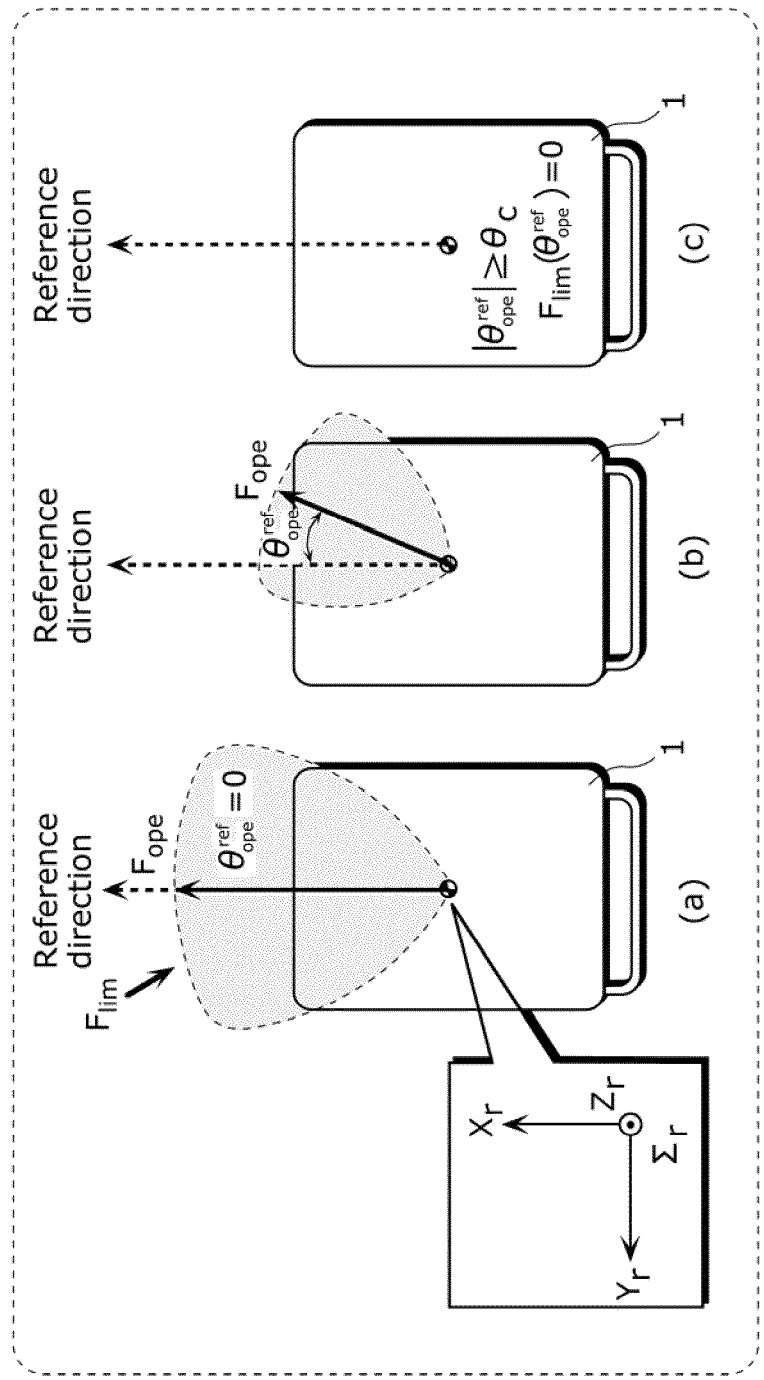
FIG. 9 shows an upper limit (5) to the assisting force of the power assisted trolley 1 according to Embodiment 1.

In Embodiment 1, as shown in (a) to (c) of FIG. 9, $k_2 (\theta^{ref}_{ope})$ is set to decrease from 1 with an increase in the absolute value $|\theta^{ref}_{ope}|$ of the angle $\theta^{ref}_{ope}$ between the reference direction (=a positive direction of the $X_r$-axis of the trolley coordinate system $\Sigma_r$) and the direction of the operating force $F_{ope}$, and set to zero when the absolute value $|\theta^{ref}_{ope}|$ of the angle $\theta^{ref}_{ope}$ is greater than a predetermined angular range D ($|\theta^{ref}_{ope}| \geq \theta_c$).

(a) of FIG. 9 shows an exemplary setting of the upper limit of the assisting force $F_a$ in the case where the angle $\theta^{ref}_{ope}$ between the reference direction (=the positive direction of the $X_r$-axis of the trolley coordinate system $\Sigma_r$) and the direction of the operating force $F_{ope}$ is zero.

(b) of FIG. 9 shows an exemplary setting of the upper limit of the assisting force $F_a$ in the case where the absolute value $|\theta^{ref}_{ope}|$ of the angle $\theta^{ref}_{ope}$ between the reference direction (=the positive direction of the $X_r$-axis of the trolley coordinate system $\Sigma_r$) and the direction of the operating force $F_{ope}$ is within the predetermined angular range D ($|\theta^{ref}_{ope}| \geq \theta_c$).

(c) of FIG. 9 shows an exemplary setting of the upper limit of the assisting force $F_a$ in the case where the absolute value $|\theta^{ref}_{ope}|$ of the angle $\theta^{ref}_{ope}$ between the reference direction (=the positive direction of the $X_r$-axis of the trolley coordinate system $\Sigma_r$) and the direction of the operating force $F_{ope}$ is greater than the predetermined angular range D ($|\theta^{ref}_{ope}| \geq_c$).

In Embodiment 1, $\theta_C$, which defines the angular range D, is assumed to be provided with a specific value of 45°. In this case, $k_2 (\theta^{ref}_{ope})$ is set to decrease from 1 with an increase in the absolute value $|\theta^{ref}_{ope}|$ of the angle $\theta^{ref}_{ope}$ between the reference direction (=a positive direction of the $X_r$-axis of the trolley coordinate system $\Sigma_r$) and the direction of the operating force $F_{ope}$, and set to be zero when the absolute value $|\theta^{ref}_{ope}|$ of the angle $\theta^{ref}_{ope}$ is greater than the predetermined angular range D ($|\theta^{ref}_{ope}| \geq 45°$).

Setting the upper limit of the assisting force $F_a$ in this manner makes it easy to move the power assisted trolley 1 in a direction set by the operator 13 (or a direction in which the operator 13 may safely move the power assisted trolley 1 with a clear view) ($|\theta^{ref}_{ope}| < 45°$), and makes it difficult to move in a direction set by the operator 13 (or a direction in which the operator 13 may not safely move the power assisted trolley 1 due to a blocked view) ($|\theta^{ref}_{ope}| \geq 45°$). The power assisted trolley 1 is thus configured as an electric vehicle operable with increased safety.

The operator 13 may set one or more reference directions in addition to the reference direction (=the positive direction of the $X_r$-axis of the trolley coordinate system $\Sigma_r$). For example, when there are two directions in which the operator 13 may easily move the power assisted trolley 1 (or may safely move the power assisted trolley 1 with a clear view), the two directions may be set as reference directions. In the case of the independent two-wheel drive configuration, for example, two directions perpendicular to the axle (forward and backward directions) are set as reference directions. In this case, since the power assisted trolley 1 may be easily moved in the set two directions (forward and backward directions) due to its structure, assisting movements in the directions may be set to be large and assisting movements in the other directions may be set to be small. As a result, a control system is simpler in configuration.

Figure 10:
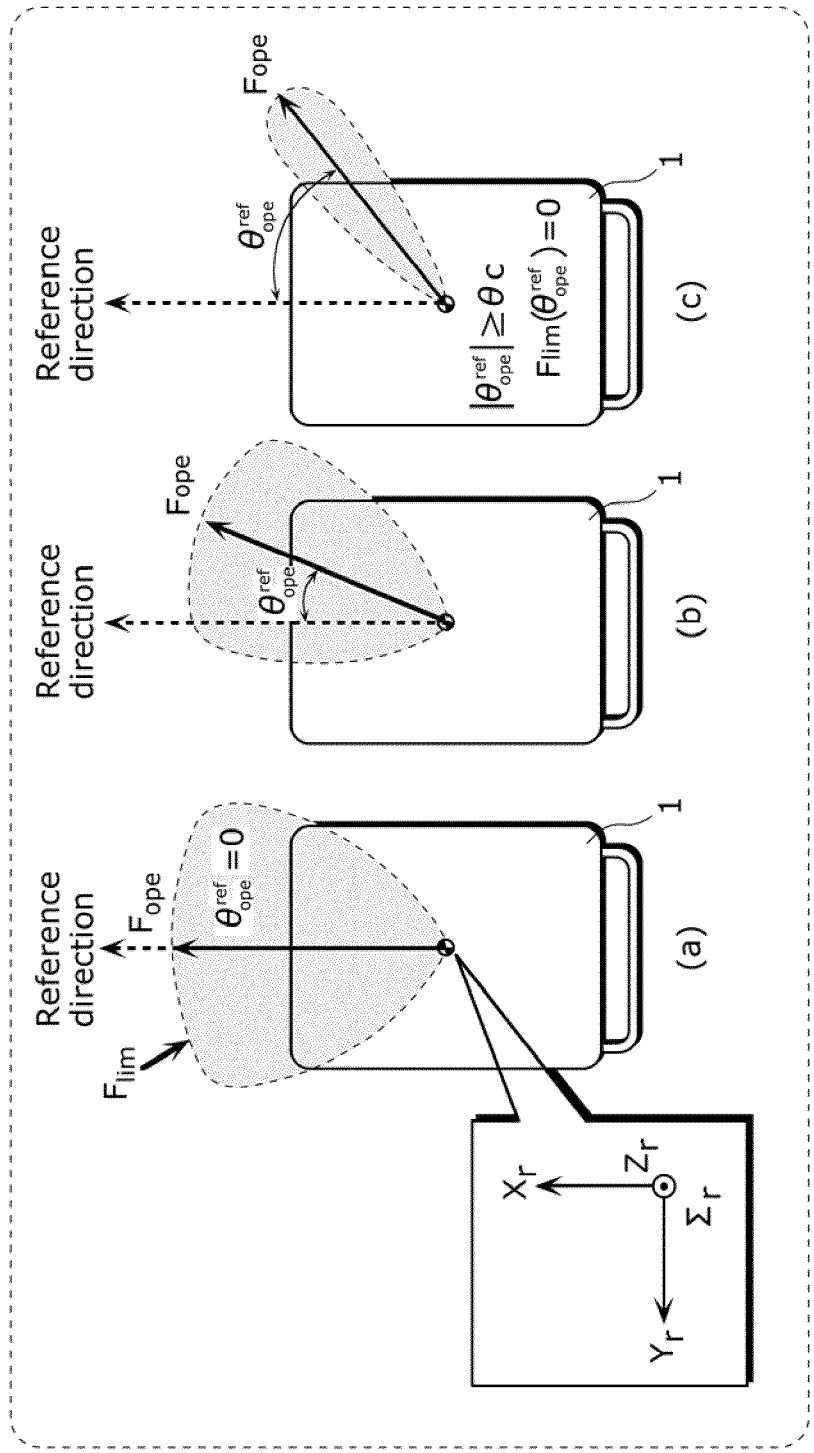
FIG. 10 shows an upper limit (6) to the assisting force of the power assisted trolley 1 according to Embodiment 1.

Optionally, as shown in (a) to (c) of FIG. 10, $\theta^+_A$, $\theta^-_A$, $\theta^+_B$, and $\theta^-_B$ may be decreased with an increase in the absolute value $|\theta^{ref}_{ope}|$ of the angle $\theta^{ref}_{ope}$ between the reference direction (=the positive direction of the $X_r$-axis of the trolley coordinate system $\Sigma_r$) and the direction of the operating force $F_{ope}$, where $k_2(\theta^{ref}_{ope})=1$.

(a) of FIG. 10 shows an exemplary setting of the upper limit of the assisting force $F_a$ in the case where the angle $\theta^{ref}_{ope}$ between the reference direction (=the positive direction of the $X_r$-axis of the trolley coordinate system $\Sigma_r$) and the direction of the operating force $F_{ope}$ is zero.

(b) of FIG. 10 shows an exemplary setting of the upper limit of the assisting force $F_a$ in the case where the absolute value $|\theta^{ref}_{ope}|$ of the angle $\theta^{ref}_{ope}$ between the reference direction (=the positive direction of the $X_r$-axis of the trolley coordinate system $\Sigma_r$) and the direction of the operating force $F_{ope}$ is a value other than zero.

(c) of FIG. 10 shows an exemplary setting of the upper limit of the assisting force $F_a$ in the case where the absolute value $|\theta^{ref}_{ope}|$ of the angle $\theta^{ref}_{ope}$ between the reference direction (=the positive direction of the $X_r$-axis of the trolley coordinate system $\Sigma_r$) and the direction of the operating force $F_{ope}$ is greater than the absolute value $|\theta^{ref}_{ope}|$ shown in (b) of FIG. 10. Setting the upper limit of the assisting force $F_a$ in this manner also makes it easy to move the power assisted trolley 1 in the direction set by the operator 13 (or a direction in which the operator 13 may safely move the power assisted trolley 1 with a clear view), and makes it difficult to move the power assisted trolley 1 in the direction set by the operator 13 (or a direction in which the operator 13 may not safely move the power assisted trolley 1 due to a blocked view). The power assisted trolley 1 is thus configured as an electric vehicle operable with increased safety.

Figure 11:
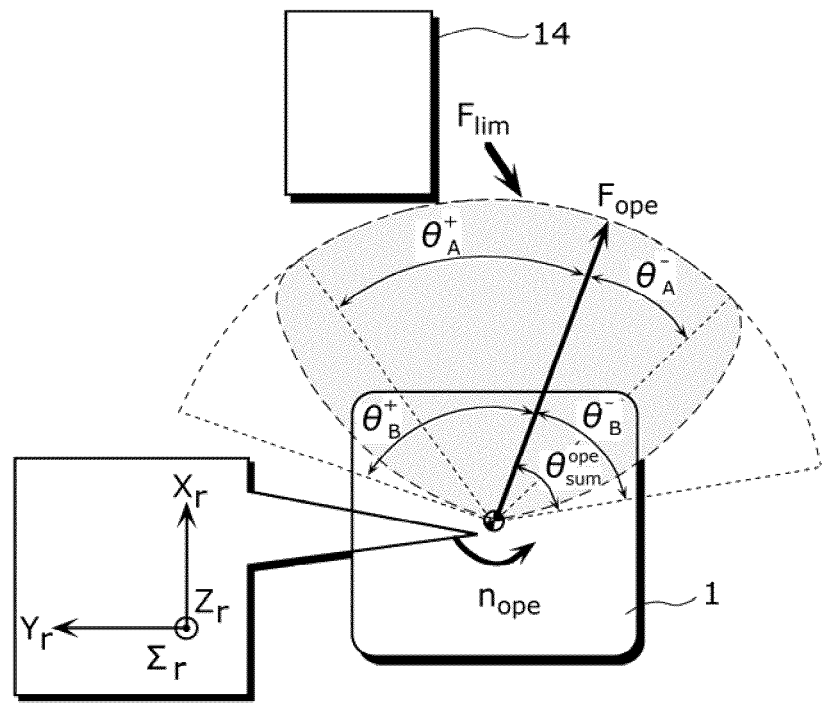
FIG. 11 shows an upper limit (7) to the assisting force of the power assisted trolley 1 according to Embodiment 1.

When not only a force but also a moment is simultaneously acting on the power assisted trolley 1 as the operating force $F_{ope}$, $\theta^+_A$, $\theta^-_A$, $\theta^+_B$, and $\theta^-_B$ may be changed depending on the magnitude and direction of the acting moment. For example, when not only a force but also a counterclockwise moment is acting on the power assisted trolley 1 as the operating force $F_{ope}$ as shown in FIG. 11, the values of $\theta^+_A$ and $\theta^+_B$ are increased in proportion to the magnitude of the moment, with an upper limit of twice to three times of the values of $\theta^+_A$ and $\theta^+_B$ set in the case where no moment is acting on the power assisted trolley 1. In contrast, when not only a force but also a clockwise moment is acting on the power assisted trolley 1 as the operating force $F_{ope}$, the values of $\theta^-_A$ and $\theta^-_B$ are increased in proportion to the magnitude of the moment, with an upper limit of twice to three times of the values of $\theta^-_A$ and $\theta^-_B$ set in the case where no moment is acting on the power assisted trolley 1. In this configuration, when not only a force but also a moment is acting on the power assisted trolley 1 as the operating force $F_{ope}$, setting in this manner allows the power assisted trolley 1 to move in the direction of the moment more easily, and thus operability of the power assisted trolley 1 is increased.

Thus, generation of an unexpected assisting force is prevented when the operator 13 is not operating the power assisted trolley 1, and so is generation of an assisting force widely different from a force applied by the operator 13 in direction or magnitude. The power assisted trolley 1 is thus configured as an electric vehicle operable with enhanced safety.

Next, the assisting movement calculation unit 11 performs an impedance control based on the assisting force $F_a$ calculated by the assisting force calculation unit 10 (Step S8). Specifically, the assisting movement calculation unit 11 calculates the assisting movement of the power assisted trolley 1 on the basis of apparent impedance properties represented by (Eq. 11) which includes apparent mass properties represented by (Eq. 9) and apparent viscosity properties represented by (Eq. 10).

[Math. 9]

$$M_a = \begin{bmatrix} M_a^x & 0 & 0 \\ 0 & M_a^y & 0 \\ 0 & 0 & M_a^\theta \end{bmatrix} \in R^{3 \times 3} \quad (\text{Eq. 9})$$

[Math. 10]

$$D_a = \begin{bmatrix} D_a^x & 0 & 0 \\ 0 & D_a^y & 0 \\ 0 & 0 & D_a^\theta \end{bmatrix} \in R^{3 \times 3} \quad (\text{Eq. 10})$$

[Math. 11]

$$\begin{bmatrix} f_a^x \\ f_a^y \\ n_a \end{bmatrix} = \begin{bmatrix} M_a^x & 0 & 0 \\ 0 & M_a^y & 0 \\ 0 & 0 & M_a^\theta \end{bmatrix} \begin{bmatrix} \dot{v}_a^x \\ \dot{v}_a^y \\ \dot{\omega}_a \end{bmatrix} + \begin{bmatrix} D_a^x & 0 & 0 \\ 0 & D_a^y & 0 \\ 0 & 0 & D_a^\theta \end{bmatrix} \begin{bmatrix} v_a^x \\ v_a^y \\ \omega_a \end{bmatrix}, \quad (\text{Eq. 11})$$

where $V_a = [v_a^x \ v_a^y \ \omega_a]^T$
and $\dot{V}_a^d = [\dot{v}_a^x \ \dot{v}_a^y \ \dot{\omega}_a]^T \in R^3$ Here, $V_a$ denotes an assisting movement velocity of the power assisted trolley 1, and $\dot{V}^d_a$ denotes assisting movement acceleration. (Eq. 11) may be transformed into (Eq. 12).

[Math. 12]

$$\begin{bmatrix} v_a^x \\ v_a^y \\ \omega_a \end{bmatrix} = \begin{bmatrix} L^{-1}[\cdot] & 0 & 0 \\ 0 & L^{-1}[\cdot] & 0 \\ 0 & 0 & L^{-1}[\cdot] \end{bmatrix} \quad (\text{Eq. 12})$$

$$\begin{bmatrix} \frac{1}{M_a^x s + D_a^x} & 0 & 0 \\ 0 & \frac{1}{M_a^y s + D_a^y} & 0 \\ 0 & 0 & \frac{1}{M_a^\theta s + D_a^\theta} \end{bmatrix}$$

$$\begin{bmatrix} L[\cdot] & 0 & 0 \\ 0 & L[\cdot] & 0 \\ 0 & 0 & L[\cdot] \end{bmatrix} \begin{bmatrix} f_a^x \\ f_a^y \\ n_a \end{bmatrix}$$

Here, L[ ] represents the Laplace transform, and $L^{-1}$[ ] represents the inverse Laplace transform. The assisting movement calculation unit 11 therefore receives information on the assisting force calculated by the assisting force calculation unit 10 using (Eq. 13), and then calculates the assisting movement velocity $V_a$ of the power assisted trolley 1 using (Eq. 12).

[Math. 13]

$$\vec{F}_a = [f_a^x f_a^y n_a]^T \quad (\text{Eq. 13})$$

Next, the drive controller unit 12 converts the assisting movement velocity of the power assisted trolley 1 calculated by the assisting movement calculation unit 11 into a rotation speed of the wheel 5 (Step S9). Here, when the rotation speed of the wheel 5 is defined using (Eq. 14), a relational expression of (Eq. 15) holds between the assisting movement velocity $V_a$ of the power assisted trolley 1 and rotation speed $\Omega_a$ of the wheel 5 in the case where the wheels are configured and disposed as shown in FIG. 2.

[Math. 14]

$$\Omega_a = [\omega_a^1 \quad \omega_a^2 \quad \omega_a^3 \quad \omega_a^4]^T \in R^4 \quad \text{(Eq. 14)}$$

[Math. 15]

$$\begin{bmatrix} v_a^x \\ v_a^y \\ \omega_a \end{bmatrix} = \frac{\sqrt{2}\,r}{4} \begin{bmatrix} -1 & -1 & 0 & 0 \\ 0 & -1 & -1 & 0 \\ \frac{L_w+L_d}{2(L_w^2+L_d^2)} & \frac{L_w+L_d}{2(L_w^2+L_d^2)} & \frac{L_w+L_d}{2(L_w^2+L_d^2)} & \frac{L_w+L_d}{2(L_w^2+L_d^2)} \end{bmatrix} \begin{bmatrix} \omega_a^1 \\ \omega_a^2 \\ \omega_a^3 \\ \omega_a^4 \end{bmatrix} \quad \text{(Eq. 15)}$$

Here, as shown in FIG. 2, $L_w$ is half the distance between the right and left wheels 5, and $L_d$ is half the distance between the front and rear wheels 5, where $L_w \in R$, and $L_d \in R$. r is the radius of the wheels 5, where $r \in R$. (Eq. 15) may be transformed into (Eq. 16).

[Math. 16]

$$\begin{bmatrix} \omega_a^1 \\ \omega_a^2 \\ \omega_a^3 \\ \omega_a^4 \end{bmatrix} = \frac{1}{\sqrt{2}\,r} \begin{bmatrix} -1 & 1 & \frac{2(L_w^2+L_d^2)}{L_w+L_d} \\ -1 & -1 & \frac{2(L_w^2+L_d^2)}{L_w+L_d} \\ 1 & -1 & \frac{2(L_w^2+L_d^2)}{L_w+L_d} \\ 1 & 1 & \frac{2(L_w^2+L_d^2)}{L_w+L_d} \end{bmatrix} \begin{bmatrix} v_a^x \\ v_a^y \\ \omega_a \end{bmatrix} \quad \text{(Eq. 16)}$$

Therefore, receiving, as an input, the assisting movement velocity $V_a$ of the power assisted trolley 1 calculated by the assisting movement calculation unit 11, the drive controller unit 12 calculates the rotation speed $\Omega_a$ of the wheel 5 using (Eq. 16). The wheel driving unit 6 performs the speed control such that the wheel 5 rotates according to the rotation speed of the wheel 5 calculated by the drive controller unit 12 and drives the wheel 5 to move the power assisted trolley 1 (Step S10).

Figure 26:
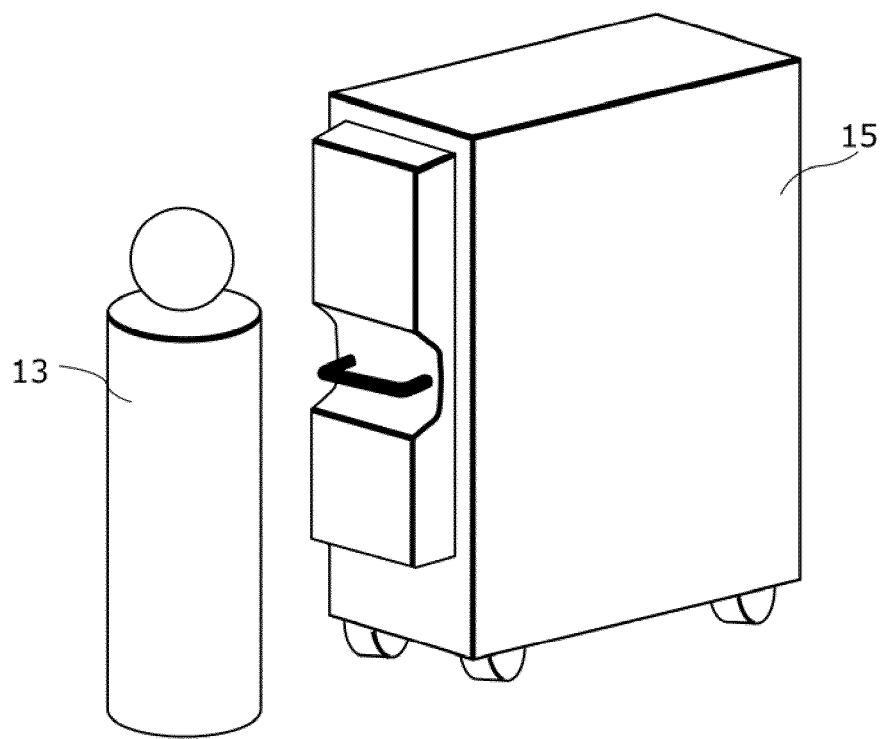
FIG. 26 illustrates a perspective view of a power assisted cart which is an application example of Embodiment 1.

The power assisted trolley 1 is thus moved on the basis of the operating force $F_{ope}$ applied by the operator 13 to the handle 3. The configuration according to the present invention is not limited to the power assisted trolley 1 described according to Embodiment 1 with reference to FIG. 1. Embodiment 1 is applicable to a variety of controlled electric vehicles such as a power assisted cart 15 as shown in FIG. 26 and a shopping cart.

Embodiment 2

The following describes an electric wheelchair, which is one of the electric vehicles according to another embodiment of the present invention.

Figure 12:
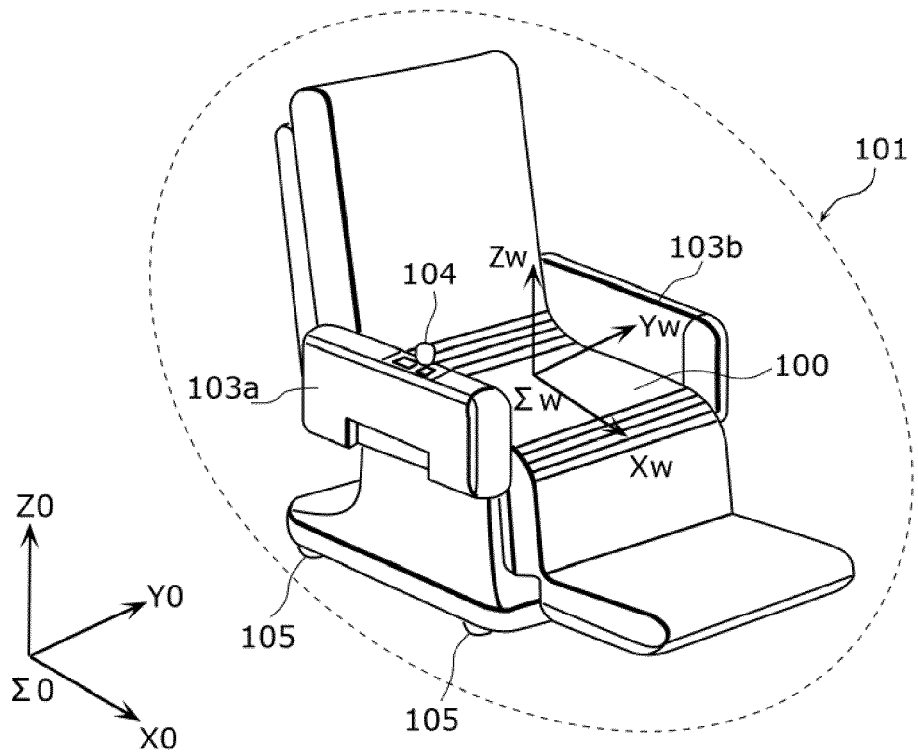
FIG. 12 illustrates a perspective view of an electric wheelchair 101 according to Embodiment 2.
Figure 13:
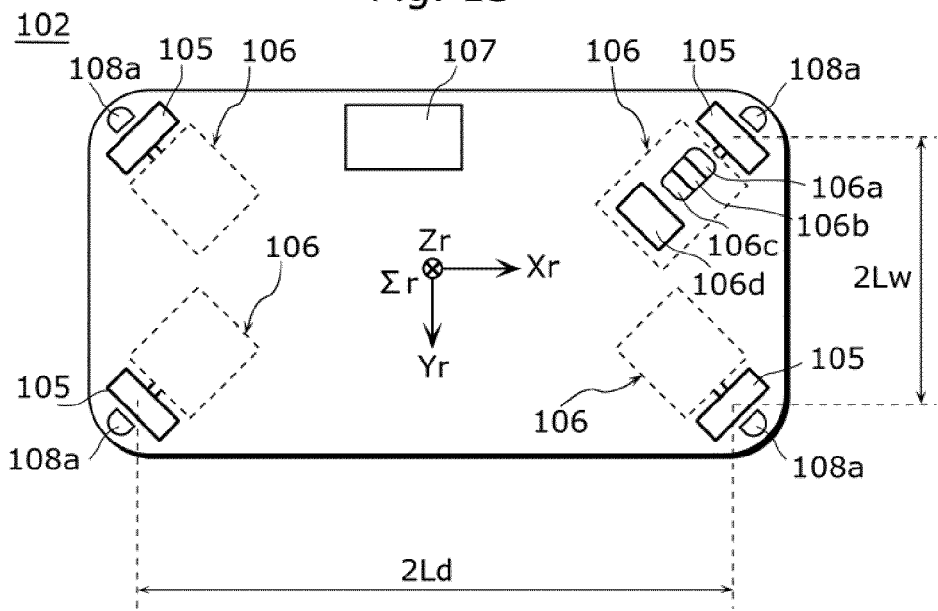
FIG. 13 illustrates a bottom view of the electric wheelchair 101 according to Embodiment 2.

FIG. 12 illustrates a perspective view of an electric wheelchair 101 according to Embodiment 2 of the present invention, and FIG. 13 illustrates a bottom view of the electric wheelchair 101 according to Embodiment 2.

An electric wheel chair coordinate system $\Sigma_w$ (having three axes of an $X_w$-axis, a $Y_w$-axis, and a $Z_w$-axis orthogonal to each other) is provided which is fixed to the electric wheelchair 101 and moves together with the movement of the electric wheelchair 101 (see FIG. 11). An $X_w$-$Y_w$ plane of the electric wheel chair coordinate system $\Sigma_w$ is a horizontal plane parallel to the ground. The $X_w$-axis extends in the direction toward the front of the electric wheelchair 101. The current position of the electric wheelchair 101 is defined by a position vector and orientation of the electric wheel chair coordinate system $\Sigma_w$ with respect to the reference coordinate system $\Sigma_0$ provided as in FIG. 13. In these drawings, the electric wheelchair 101 includes a seat unit 102 on which an operator (not shown) is to be seated on, and a right armrest 103a and a left armrest 103b on which the operator puts the operator's right and left arms, respectively. The electric wheel chair coordinate system $\Sigma_w$ has an origin at the center of the seat unit 102 (the center of four wheels 105).

The right armrest 103 is provided with a control input measurement unit 104. The control input measurement unit 104 has a joystick 104a for the operator to provide movement instructions to the electric wheelchair 101. The control input measurement unit 104 measures a control input provided to the joystick 104, specifically, the amount and direction of a tilt of the joystick 104a caused by the operator, to determine the magnitude and direction of a movement instruction provided by the operator (an instruction of a translational movement in the $X_w$-axis direction or the $Y_w$-axis direction, or a rotational movement around the $Z_w$-axis of the electric wheel chair coordinate system $Z_w$).

Provided below the seat unit 102 are wheels 105 which allow the electric wheelchair 101 to travel, wheel driving units 106 which drive the wheels 105, and a controller 107 which is a control system of the electric wheelchair 101. Specific control laws of the electric wheelchair 101 are provided by the controller 107.

In Embodiment 2, four omni wheels which are commercially available omni-directional wheels are used as the wheels 105. The wheels are configured and disposed as shown in FIG. 13. The electric wheelchair 101 may have an independent two-wheel drive configuration in which two commercially available pneumatic tires are used. This configuration is not described in the present description. In this case, several commercially available casters are preferably used as auxiliary wheels so that the electric wheelchair 1 is stably supported.

Each of the wheel driving unit 106 includes a reducer 106a, an electric motor 106b, an encoder 106c which measures a rotation angle of the electric motor, and a servo driver 106d which drives the electric motor 106b. In Embodiment 2, the speed of the electric motor 106b is controlled so that it rotates at a specified speed.

The electric wheelchair 101 further includes obstacle measurement units 108 positioned in the lateral face of the seat unit 102. The obstacle measurement units 108 measure a distance from the electric wheelchair 101 to an obstacle 14 and a direction thereof. The obstacle measurement unit 108 outputs information with reference to the electric wheel chair coordinate system $\Sigma_w$. In Embodiment 2, commercially available laser range sensors 108a are used as the obstacle measurement units 108 and provided at the four corners of the seat unit 102. Each of the laser range sensors 108a has a detection range of 270 degrees so that the laser range sensors 108a provided at the four corners of the seat unit 102 may measure a distance and a direction to an obstacle in all the directions from the electric wheelchair 101.

Figure 14:
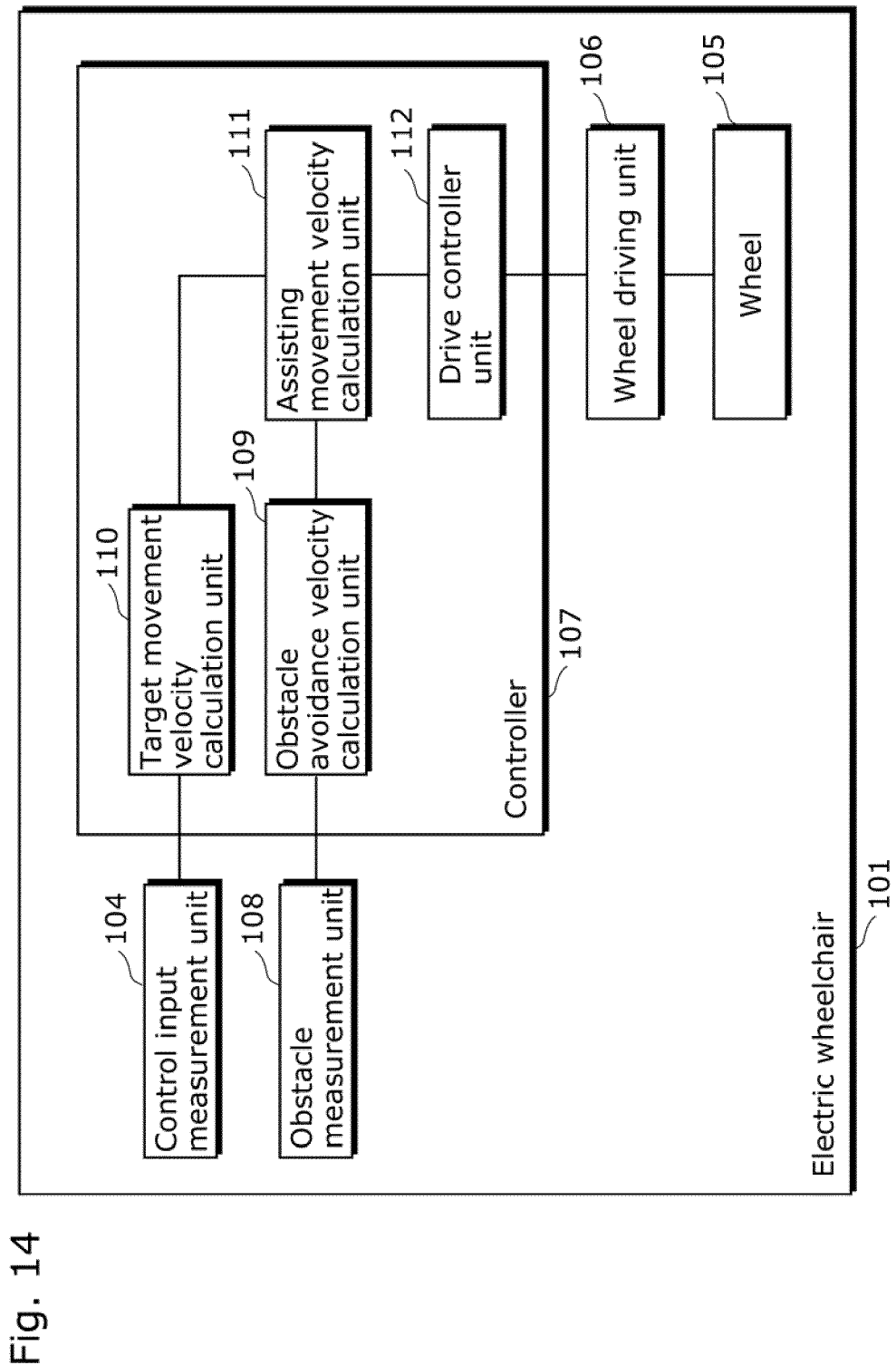
FIG. 14 is a block diagram showing a system configuration of the electric wheelchair 101 according to Embodiment 2.

FIG. 14 is a block diagram showing a system configuration of the electric wheelchair 101.

As shown in FIG. 14, the electric wheelchair 101 includes a control input measurement unit 104, a target movement velocity calculation unit 110, an obstacle measurement unit 108, an obstacle avoidance velocity calculation unit 109, an assisting movement velocity calculation unit 111, a drive controller unit 112, a wheel driving unit 106, and a wheel 105.

As described above, the control input measurement unit 104 measures the magnitude and direction of a control input provided to the joystick 104a by the operator.

The target movement velocity calculation unit 110 is a processing unit which calculates target movement velocities (target velocities of a translational movement in the $X_w$-axis direction or the $Y_w$-axis direction, and a target velocity of a rotational movement around the $Z_w$-axis of the electric wheel chair coordinate system $\Sigma_w$) on the basis of the control input (the control input in the $X_w$-axis direction, the $Y_w$-axis direction, and around the $Z_w$-axis of the electric wheel chair coordinate system $\Sigma_w$) measured by the control input measurement unit 104.

As described above, the obstacle measurement unit 108 measures a distance from the electric wheelchair 101 to an obstacle 14 and a direction thereto.

The obstacle avoidance velocity calculation unit 109 is a processing unit which calculates an obstacle avoidance velocity at which the electric wheelchair 101 is moved away from the obstacle 14, on the basis of the distance and direction to the obstacle 14 measured by the obstacle measurement unit 108. Collision of the electric wheelchair 101 with the obstacle 14 may be avoided by moving the electric wheelchair 101 at the obstacle avoidance velocity.

The assisting movement velocity calculation unit 111 is a processing unit which calculates an assisting movement velocity of the electric wheelchair 101 from a net velocity of the target movement velocity calculated by the target movement velocity calculation unit 110 and the obstacle avoidance velocity calculated by the obstacle avoidance velocity calculation unit 109, and provides information on the assisting movement velocity to the drive controller unit 112.

The drive controller unit 112 converts the assisting movement velocity calculated by the assisting movement velocity calculation unit 111 into a rotation speed of the wheel 105 and provides information on the rotation speed to the wheel driving unit 106.

Here, each of the target movement velocity and the obstacle avoidance velocity is information with reference to the electric wheel chair coordinate system $\Sigma_w$.

The wheel driving unit 106 controls rotation of the wheel 105 such that the wheel 105 rotates at the rotation speed resulting from the conversion by the drive controller unit 112.

In the configuration, the electric wheelchair 101 makes a movement based on the operation by the operator.

Figure 15A:
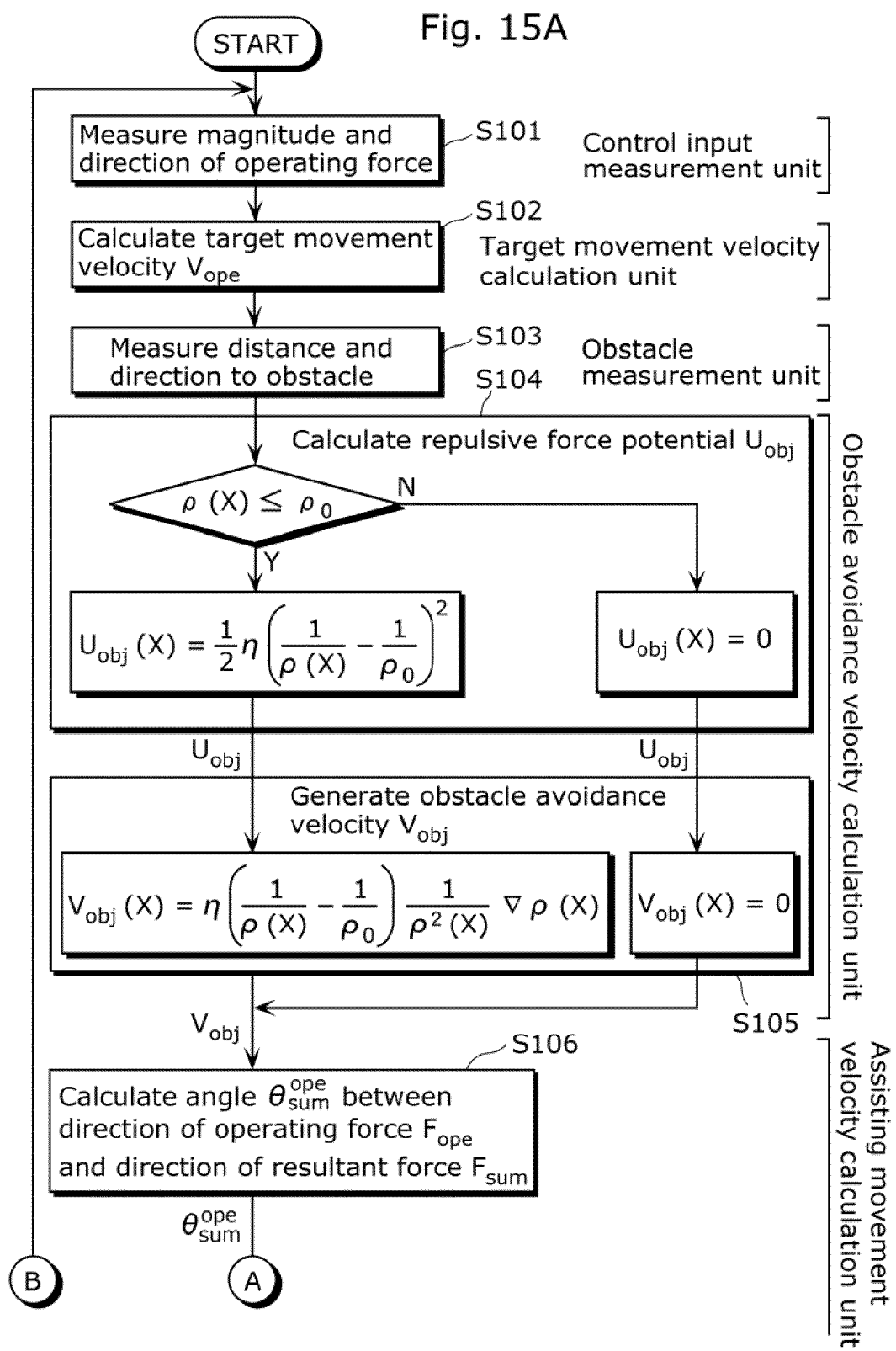
FIG. 15A is a first half of a flowchart of the electric wheelchair 101 according to Embodiment 2.
Figure 15B:
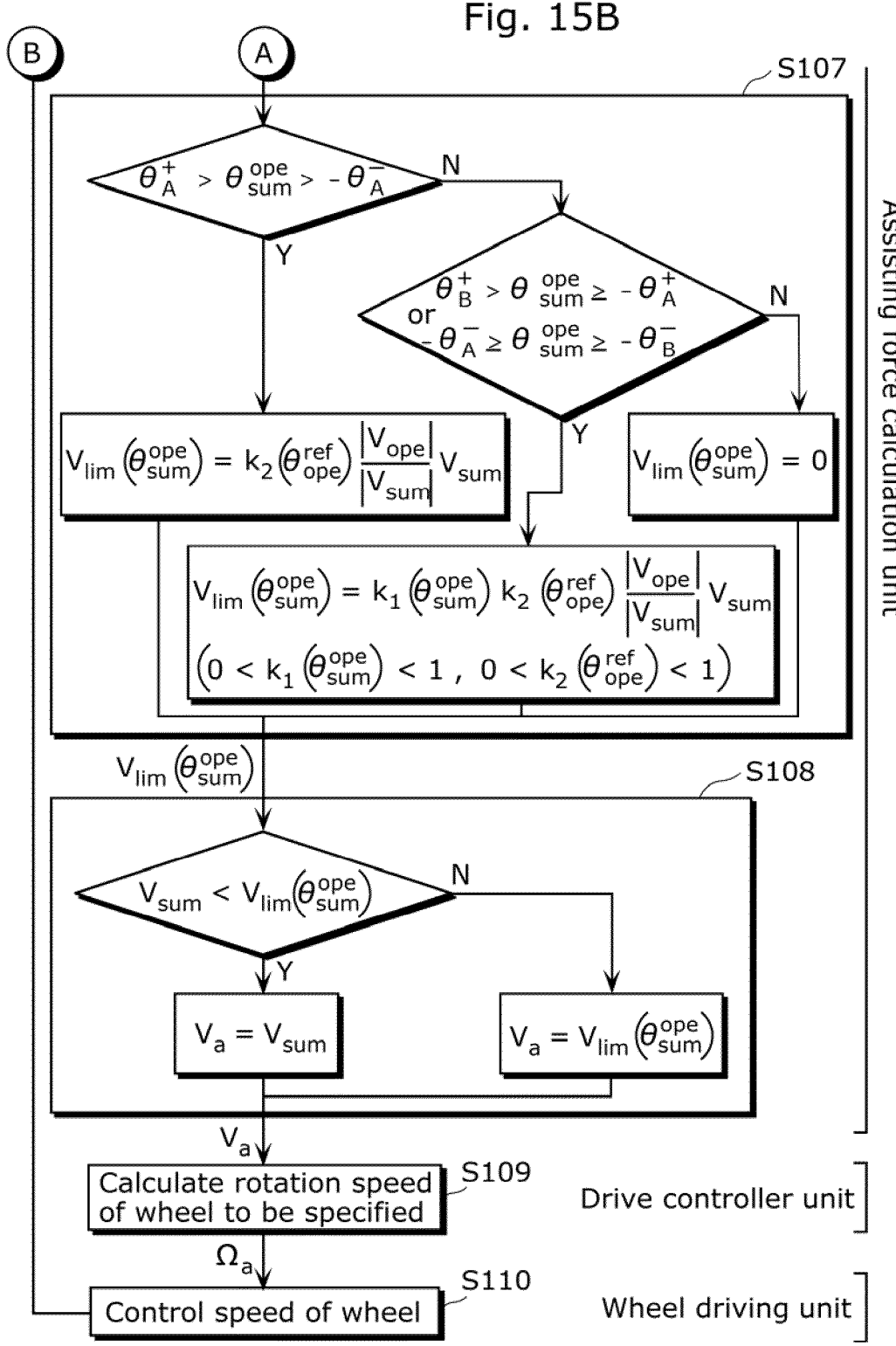
FIG. 15B is a second half of the flowchart of the electric wheelchair 101 according to Embodiment 2.

The following describes an example in which a specific control law is used in the configuration, with reference to a flowchart shown in FIG. 15.

First, the control input measurement unit 104 measures the magnitude and direction of a control input provided to the joystick 104a by the operator (Step S101). Here, control input provided to the joystick 104a by the operator is denoted by $\Delta X_{joy}$, where $\Delta X_{joy} = [\Delta x_{joy} \, \Delta y_{joy} \, \Delta \theta_{joy}] \in R^3$. $\Delta x_{joy}$, $\Delta y_{joy}$, and $\Delta \theta_{joy}$ respectively denote a control input for movement in the $X_w$-axis direction, a control input for movement the $Y_w$-axis direction, and a control input for movement around the $Z_w$-axis of the electric wheel chair coordinate system $\Sigma_w$, where $\Delta \theta_{joy} \in R$. The target movement velocity calculation unit 110 calculates a target movement velocity $V_{ope}$ of (Eq. 17) having a magnitude in proportion to the control input $\Delta X_{joy}$ measured by the control input measurement unit 104 (velocities of a translational movement in the $X_w$-axis direction and the $Y_w$-axis direction, and a rotational movement around the $Z_w$-axis of the electric wheel chair coordinate system) using (Eq. 18) (Step S102).

[Math. 17]

$$V_{ope} = [v_{ope}^x \quad v_{ope}^y \quad v_{ope}^\theta]^T \in R^3 \qquad (Eq.\ 17)$$

[Math. 18]

$$\begin{bmatrix} v_{ope}^x \\ v_{ope}^y \\ \omega_{ope} \end{bmatrix} = \begin{bmatrix} k_{joy}^x & 0 & 0 \\ 0 & k_{joy}^y & 0 \\ 0 & 0 & k_{joy}^\theta \end{bmatrix} \begin{bmatrix} \Delta x_{joy} \\ \Delta y_{joy} \\ \Delta \theta_{joy} \end{bmatrix} \qquad (Eq.\ 18)$$

Here, $K_{joy}$ in (Eq. 19) denotes a constant for calculation of a target movement velocity and has a positive value. When the operator is making no operation, the calculation is performed on the basis that the target movement velocity is zero.

[Math. 19]

$$K_{joy} = \begin{bmatrix} k_{joy}^x & 0 & 0 \\ 0 & k_{joy}^y & 0 \\ 0 & 0 & k_{joy}^\theta \end{bmatrix} \in R^{3 \times 3} \qquad (Eq.\ 19)$$

Next, the obstacle measurement unit 8 measures the distance from the electric wheelchair 101 to the obstacle 14 and the direction thereto (Step S103).

Next, the obstacle avoidance velocity calculation unit 109 calculates an obstacle avoidance velocity at which the electric wheelchair 101 is moved away from the obstacle 14. First, the obstacle avoidance velocity calculation unit 109 calculates a repulsive force potential $U_{obj}(X)$ for the distance to the obstacle 14 using (Eq. 2), where $U_{obj}(X) \in R$ (Step S104).

[Math. 20]

$$U_{obj}(X) = \begin{cases} \frac{1}{2}\eta\left(\frac{1}{\rho(X)} - \frac{1}{\rho_0}\right)^2 & (\text{if } \rho(X) \leq \rho_0) \\ 0 & (\text{if } \rho(X) > \rho_0) \end{cases} \qquad (Eq.\ 20)$$

X denotes a vector representing a current position of the electric wheelchair 101, where $X = [x \, y \, \theta]^T \in R^3$. $\eta$ denotes a positive weighting factor, where $\eta \in R$. $\rho(X)$ denotes a distance of closest approach from X to the obstacle 14, where $\rho(X) \in R$. $\rho_0$ denotes a positive constant, where $\rho_0 \in R$. The repulsive force potential $U_{obj}(X)$, which is equal to or greater than zero, increases toward infinity as the electric wheelchair 101 comes closer to a region where the obstacle is present, and is zero when the distance from the electric wheelchair 101 to the obstacle 14 is equal to or longer than $\rho_0$.

Here, the an obstacle avoidance velocity $V_{obj}$ is calculated using (Eq. 22) from the repulsive force potential calculated using (Eq. 20), where the obstacle avoidance velocity $V_{obj}$ of the electric wheelchair 101 is represented by (Eq. 21) (Step S105).

[Math. 21]

$$V_{obj} = [v_{obj}^x \quad v_{obj}^y \quad \omega_{obj}]^T \in R^3 \qquad (Eq.\ 21)$$

-continued

[Math. 22]

$$V_{obj} = -\nabla U_{obj}(X) = -\begin{bmatrix} \frac{\partial U_{obj}(X)}{\partial x} \\ \frac{\partial U_{obj}(X)}{\partial y} \\ \frac{\partial U_{obj}(X)}{\partial \theta} \end{bmatrix} \quad \text{(Eq. 22)}$$

Here, $\nabla U_{obj}(X)$ denotes a gradient vector of $U_{obj}(X)$ at the current position X of the electric wheelchair 101. From (Eq. 20) and (Eq. 22), the obstacle avoidance velocity of the electric wheelchair 101 at the current position X is represented by (Eq. 23).

[Math. 23]

$$V_{obj} = \begin{cases} \eta\left(\frac{1}{\rho(X)} - \frac{1}{\rho_0}\right)\frac{1}{\rho^2(X)}\nabla\rho(X) & \text{(if } \rho(X) \leq \rho_0) \\ 0 & \text{(if } \rho(X) > \rho_0) \end{cases} \quad \text{(Eq. 23)}$$

The resultant obstacle avoidance velocity is a virtual force which has a magnitude inversely proportional to the distance to the obstacle 14 and directs the electric wheelchair 101 in the direction opposite to the direction to the obstacle 14. Collision of the electric wheelchair 101 with the obstacle 14 may be avoided by moving the electric wheelchair 101 at the obstacle avoidance velocity 14.

Here, a net velocity $V_{sum}$ of the target movement velocity $V_{ope}$ and the obstacle avoidance velocity $V_{obj}$ is represented by (Eq. 25), where the net velocity $V_{obj}$ of the target movement velocity $V_{ope}$ and the obstacle avoidance velocity $V_{obj}$ is represented by (Eq. 24).

[Math. 24]

$$V_{sum} = [v_{sum}^x \quad v_{sum}^y \quad \omega_{sum}]^T \in R^3 \quad \text{(Eq. 24)}$$

[Math. 25]

$$V_{sum} = V_{ope} + V_{obj} = \begin{bmatrix} v_{ope}^x + v_{obj}^x \\ v_{ope}^y + v_{obj}^y \\ \omega_{ope} + \omega_{obj} \end{bmatrix} \quad \text{(Eq. 25)}$$

Here, in the conventional technique, the assisting movement velocity $V_a$ is set to the net velocity $V_{sum}$, and the electric wheelchair 101 is moved at the assisting movement velocity $V_a$ (=$V_{ope}$+$V_{obj}$). However, as described above, the electric wheelchair using the conventional technique may unexpectedly move without an operation by the operator or make a movement widely different from a movement intended by the operator in direction or magnitude, depending on the magnitude or direction of the obstacle avoidance velocity. In this manner, the conventional technique may cause a safety problem.

In order to solve the problem, in Embodiment 2, the assisting movement velocity calculation unit 111 determines the magnitude of the assisting movement velocity $V_a$ on the basis of the target movement velocity $V_{ope}$. The target movement velocity is the target movement velocity $V_{ope}$ to be generated in proportion to the magnitude of a control input provided into the electric wheelchair 101 by the operator. Specifically, the assisting movement velocity calculation unit calculates the assisting movement velocity $V_a$ using (Eq. 25) (Step S108).

[Math. 26]

$$V_a = \begin{cases} V_{sum} & \text{(if } V_{sum} \leq V_{lim}(\theta_{sum}^{ope})) \\ V_{lim}(\theta_{sum}^{ope}) & \text{(if } V_{sum} > V_{lim}(\theta_{sum}^{ope})) \end{cases} \quad \text{(Eq. 26)}$$

Here, $V_{lim}(\theta_{sum}^{ope})$ denotes an upper limit Y of the assisting movement velocity $V_a$, and is defined on the basis of an angle $\theta_{sum}^{ope}$ between the direction of the target movement velocity $V_{ope}$ and the direction of the net velocity $V_{sum}$ (=the target movement velocity $V_{ope}$+the obstacle avoidance velocity $V_{obj}$), where $V_{lim}(\theta_{sum}^{ope}) \in R$, and $\theta_{sum}^{ope} \in R$ (Step S106).

In Embodiment 2, curves shown in FIG. 16 to FIG. 22 are provided as an example of the $V_{lim}(\theta_{sum}^{ope})$, which is the upper limit Y of the assisting movement velocity $V_a$ (Step S107). As shown in FIG. 16 to FIG. 22, $V_{lim}(\theta_{sum}^{ope})$, which is the upper limit Y of the assisting movement velocity $V_a$, is set to be equal to the magnitude of the target movement velocity $V_{ope}$ when the angle $\theta_{sum}^{ope}$ between the direction of the target movement velocity $V_{ope}$ and the direction of the net velocity $V_{sum}$ is within a predetermined angular range A ($\theta_A^- > \theta_{sum}^{ope} \geq -\theta_A^+$). On the other hand, when the angle between the direction of the target movement velocity $V_{ope}$ and the direction of the net velocity $V_{sum}$ is within a predetermined angular range B ($\theta_B^+ > \theta_{sum}^{ope} \geq \theta_A^+$ or $-\theta_A^- > \theta_{sum}^{ope} \geq -\theta_B^-$), $V_{lim}(\theta_{sum}^{ope})$ is set so as to gradually decrease from the magnitude equal to that of the target movement velocity $V_{ope}$ with an increase in $|\theta_{sum}^{ope}|$, which is the absolute value of the angle $\theta_{sum}^{ope}$ between the direction of the target movement velocity $V_{ope}$ and the direction of the net velocity $V_{sum}$. In addition, $V_{lim}(\theta_{sum}^{ope})$, the upper limit Y of the assisting movement velocity $V_a$, is set to zero when the angle $\theta_{sum}^{ope}$ between the direction of the target movement velocity $V_{ope}$ and the direction of the net velocity $V_{sum}$ is within a predetermined angular range C ($\theta_{sum}^{ope} \geq \theta_B^+$ or $-\theta_B^- > \theta_{sum}^{ope}$).

Figure 16:
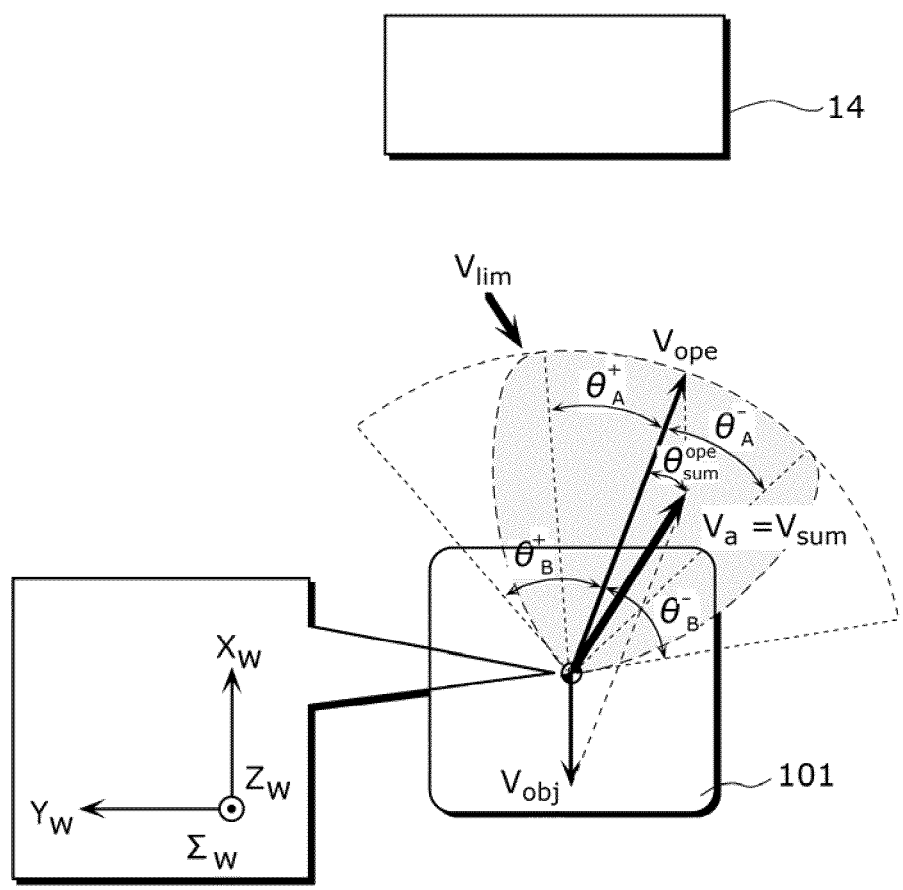
FIG. 16 shows an upper limit (1) to assisting force of the electric wheelchair 101 according to Embodiment 2.

FIG. 16 shows an example in which the assisting movement velocity $V_a$ is determined when the angle $\theta_{sum}^{ope}$ between the direction of the target movement velocity $V_{ope}$ and the direction of the net velocity $V_{sum}$ is within the predetermined angular range A ($\theta_A^- > \theta_{sum}^{ope} \geq -\theta_A^+$) and the magnitude of the net velocity $V_{sum}$ is smaller than the upper limit Y of the assisting movement velocity $V_a$.

Figure 17:
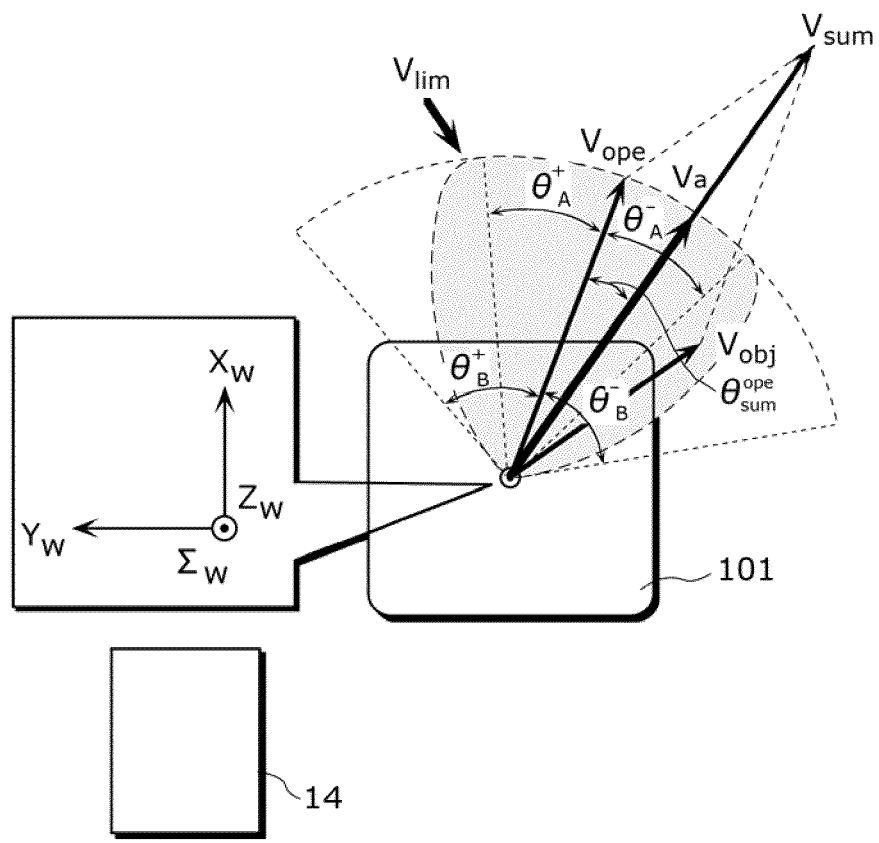
FIG. 17 shows an upper limit (2) to assisting force of the electric wheelchair 101 according to Embodiment 2.

FIG. 17 shows an example in which the assisting movement velocity $V_a$ is determined when the angle $\theta_{sum}^{ope}$ between the direction of the target movement velocity $V_{ope}$ and the direction of the net velocity $V_{sum}$ is within the predetermined angular range A ($\theta_A^- > \theta_{sum}^{ope} \geq -\theta_A^+$) and the magnitude of the net velocity $V_{sum}$ is greater than the upper limit Y of the assisting movement velocity $V_a$.

Figure 18:
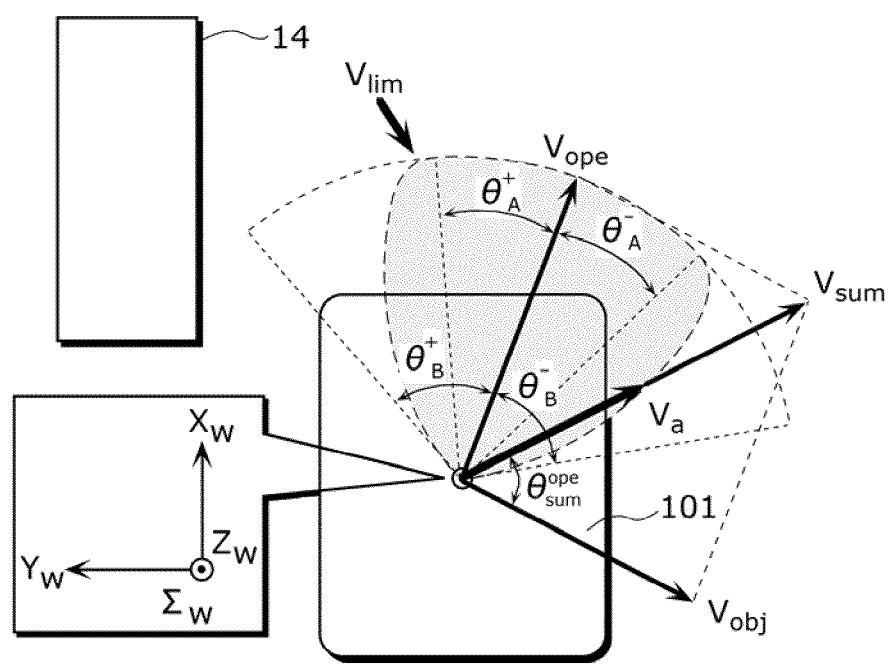
FIG. 18 shows an upper limit (3) to assisting force of the electric wheelchair 101 according to Embodiment 2.

FIG. 18 shows an example in which the assisting force $F_a$ is determined when the angle $\theta_{sum}^{ope}$ between the direction of the target movement velocity $V_{ope}$ and the direction of the net velocity $V_{sum}$ is within the predetermined angular range B ($\theta_B^+ > \theta_{sum}^{ope} \geq \theta_A^+$ or $-\theta_A^- > \theta_{sum}^{ope} \geq -\theta_B^-$) and the magnitude of the net velocity $V_{sum}$ is greater than the upper limit Y of the assisting movement velocity $V_a$.

Figure 19:
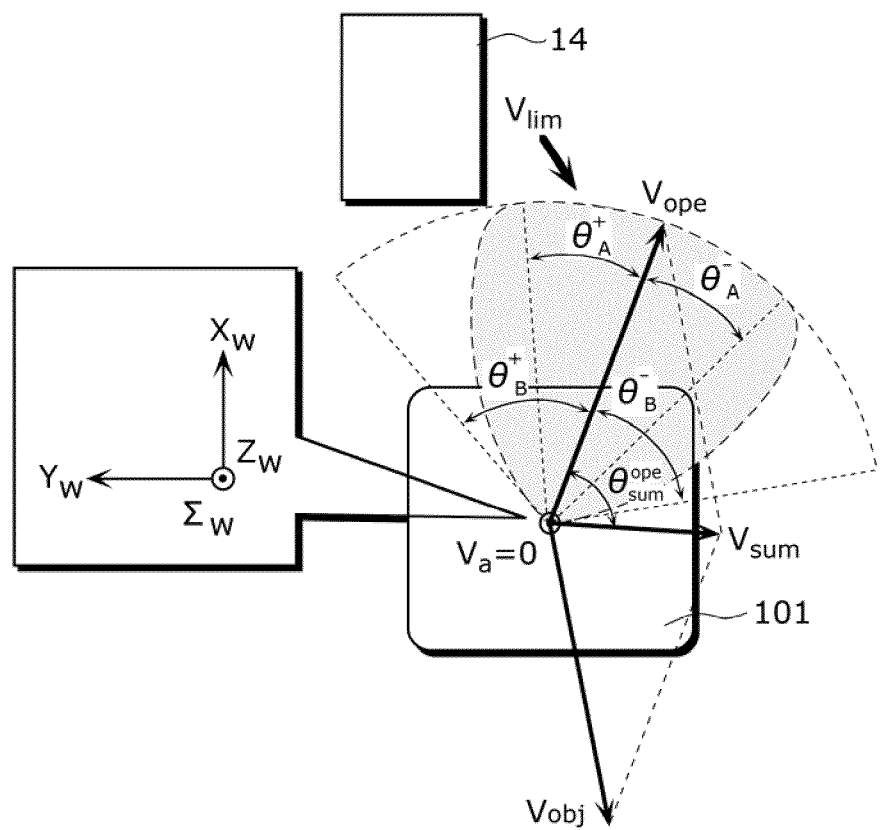
FIG. 19 shows an upper limit (4) to assisting force of the electric wheelchair 101 according to Embodiment 2.

FIG. 19 shows an example in which the assisting force $F_a$ is determined when the angle $\theta_{sum}^{ope}$ between the direction of the target movement velocity $V_{ope}$ and the direction of the net velocity $V_{sum}$ is within the predetermined angular range C ($\theta_{sum}^{ope} \geq \theta_B^+$ or $-\theta_B \geq \theta_{sum}^{ope}$).

The assisting movement velocity $V_a$ is defined as specifically shown below using (Eq. 27).

[Math. 27]

$$V_{lim}(\theta_{sum}^{ope}) = \begin{cases} \frac{|V_{ope}|}{|V_{sum}|}V_{sum} & (\text{if } \theta_A^- > \theta_{sum}^{ope} > -\theta_A^+) \\ k_1(\theta_{sum}^{ope})\frac{|V_{ope}|}{|V_{sum}|}V_{sum} & (\text{if } \theta_B^+ > \theta_{sum}^{ope} \geq \theta_A^+ \text{ or } -\theta_A^- \geq \theta_{sum}^{ope} > -\theta_B^-) \\ 0 & (\text{if } \theta_{sum}^{ope} \geq \theta_B^+ \text{ or } -\theta_B^- \geq \theta_{sum}^{ope}) \end{cases} \quad (\text{Eq. 27})$$

Here, $k_1(\theta_{sum}^{ope})$ denotes a parameter to change the upper limit of the assisting movement velocity $V_a$ and has a value defined on the basis of the angle $\theta_{sum}^{ope}$ between the direction of the target movement velocity $V_{ope}$ and the direction of the net velocity $V_{sum}$, where $k_1(\theta_{sum}^{ope}) \in R$, and $0 < k_1(\theta_{sum}^{ope}) < 1$.

In Embodiment 2, $\theta_A^+$, $\theta_A^-$, $\theta_B^+$, and $\theta_B^-$, which define the angular ranges A to C, are assumed to be provided with the following specific values: $\theta_A^+ = \theta_A^- = 30°$; and $\theta_B^+ = \theta_B^- = 60°$. In this case, $V_{lim}(\theta_{sum}^{ope})$, which is the upper limit Y of the assisting movement velocity $V_a$, is set to be equal to the magnitude of the target movement velocity $V_{ope}$ when the angle $\theta_{sum}^{ope}$ between the direction of the target movement velocity $V_{ope}$ and the direction of the net velocity $V_{sum}$ is within the predetermined angular range A ($30° > \theta_{sum}^{ope} > -30°$). On the other hand, when the angle between the direction of the target movement velocity $V_{ope}$ and the direction of the net velocity $V_{sum}$ is within the predetermined range B ($60° > \theta_{sum}^{ope} \geq 30°$ or $-30° \geq \theta_{sum}^{ope} > -60°$), $V_{lim}(\theta_{sum}^{ope})$ is set so as to gradually decrease from the magnitude equal to that of the target movement velocity $V_{ope}$ with an increase in $|\theta_{sum}^{ope}|$, which is the absolute value of the angle $\theta_{sum}^{ope}$ between the direction of the target movement velocity $V_{ope}$ and the direction of the net velocity $V_{sum}$. In addition, $V_{lim}(\theta_{sum}^{ope})$, the upper limit Y of the assisting movement velocity $V_a$, is set to zero when the angle $\theta_{sum}^{ope}$ between the direction of the target movement velocity $V_{ope}$ and the direction of the net velocity $V_{sum}$ is within the predetermined range C ($\theta_{sum}^{ope} \geq 30°$ or $-30° \geq \theta_{sum}^{ope}$).

Setting the upper limit Y of the assisting movement velocity $V_a$ in this manner produces the following advantageous effects.

First, when the angle $\theta_{sum}^{ope}$ between the direction of the target movement velocity $V_{ope}$ and the direction of the net velocity $V_{sum}$ is within the predetermined angular range A ($\theta_A^- > \theta_{sum}^{ope} \geq -\theta_A^+$), that is, when the direction of an operation by the operator (=the direction of the target movement velocity $V_{ope}$) and the direction of an actual movement (=the direction of the net velocity $V_{sum}$) approximately coincide with each other, the assisting movement velocity $V_a$ generated has a magnitude expected by the operator (=the magnitude of the target movement velocity $V_{ope}$). This causes the electric wheelchair 101 to make a movement intended by the operator.

On the other hand, when the angle $\theta_{sum}^{ope}$ between the direction of the target movement velocity $V_{ope}$ and the direction of the net velocity $V_{sum}$ is within the predetermined angular range B ($\theta_B^+ > \theta_{sum}^{ope} \geq \theta_A^+$ or $-\theta_A^- \geq \theta_{sum}^{ope} > -\theta_B^-$), that is, when the direction of an operation by the operator (=the direction of the target movement velocity $V_{ope}$) and the direction of an actual movement (=the direction of the net velocity $V_{sum}$) do not coincide with each other but the difference therebetween are within the predetermined angular range B ($\theta_B^+ > \theta_{sum}^{ope} \geq \theta_A^+$ or $-\theta_A^- \geq \theta_{sum}^{ope} > -\theta_B^-$), the assisting movement velocity $V_a$ is set so as to gradually decrease from the magnitude equal to that of the target movement velocity $V_{ope}$ with an increase in $|\theta_{sum}^{ope}|$, which is the absolute value of the angle $\theta_{sum}^{ope}$ between the direction of the target movement velocity $V_{ope}$ and the direction of the net velocity $V_{sum}$. In this configuration, the limitation to the assisting movement velocity $V_a$ increases as the difference between the direction intended by the operator (=the direction of the target movement velocity $V_{ope}$) and the direction of an actual movement (=the direction of the net velocity $V_{sum}$) becomes larger. As a result, unintended movements are made so small that safety of operation of the electric wheelchair 101 is enhanced.

In addition, when the angle $\theta_{sum}^{ope}$ between the direction of the target movement velocity $V_{ope}$ and the direction of the net velocity $V_{sum}$ is within the predetermined angular range C ($\theta_{sum}^{ope} \geq \theta_B^+$ or $-\theta_B^- \geq \theta_{sum}^{ope}$), that is, when there is a large difference between the direction intended by the operator (=the direction of the target movement velocity $V_{ope}$) and the direction of an actual movement (=the direction of the net velocity $V_{sum}$), the assisting movement velocity $V_a$ generated has a magnitude of zero (that is, no movement is made). In this configuration, no movement in the direction which is widely different from the direction intended by the operator is made, and thus safety of operation of the electric wheelchair is increased.

In addition, safety of operation of the electric wheelchair 101 may be further increased by changing the upper limit Y of the assisting movement velocity $V_a$ on the basis of $\theta_{ope}^{ref}$, where an angle between a reference direction set for the electric wheelchair 101 and the direction of the target movement velocity $V_{ope}$, where $\theta_{ope}^{ref} \in R$. For example, the operator moves the electric wheelchair 101 forward because the operator may view frontward with ease but not backward. In this case, a reference direction is set in the positive direction of the $X_w$-axis of the electric wheel chair coordinate system $\Sigma_w$. Then, the upper limit of the assisting movement velocity $V_a$ is modified on the basis of the angle $\theta_{ope}^{ref}$ between the reference direction (=the positive direction of the $X_w$-axis of the electric wheel chair coordinate system $\Sigma_w$) and the direction of the target movement velocity $V_{ope}$. Specifically, the upper limit Y of the assisting movement velocity $V_a$ is set on the basis of (Eq. 28).

[Math. 28]

$$V_{lim}(\theta_{sum}^{ope}) = \begin{cases} k_2(\theta_{ope}^{ref})\frac{|V_{ope}|}{|V_{sum}|}V_{sum} & (\text{if } \theta_A^- > \theta_{sum}^{ope} > -\theta_A^+) \\ k_1(\theta_{sum}^{ope})k_2(\theta_{ope}^{ref})\frac{|V_{ope}|}{|V_{sum}|}V_{sum} & (\text{if } \theta_B^+ > \theta_{sum}^{ope} \geq \theta_A^+ \text{ or } \\ & \quad -\theta_A^- \geq \theta_{sum}^{ope} > -\theta_B^-) \\ 0 & (\text{if } \theta_{sum}^{ope} \geq \theta_B^+ \text{ or } -\theta_B^- \geq \theta_{sum}^{ope}) \end{cases} \quad (\text{Eq. 28})$$

Here, $k_2(\theta_{ope}^{ref})$ denotes a parameter to change the upper limit Y of the assisting movement velocity $V_a$ and has a value defined on the basis of the angle $\theta_{ope}^{ref}$ between the set reference direction and the direction of the target movement velocity $V_{ope}$, where $k_2(\theta_{ope}^{ref}) \in R$, and $0 < k_2(\theta_{ope}^{ref}) < 1$. In Embodiment 2, as shown in (a) to (c) of FIG. 20, $k_2(\theta_{ope}^{ref})$ is set to decrease from 1 with an increase in the absolute value $|\theta_{ope}^{ref}|$ of the angle $\theta_{ope}^{ref}$ between the reference direction (=a positive direction of the $X_w$-axis of the electric wheel chair coordinate system $\Sigma_w$) and the direction of the target movement velocity $V_{ope}$, and set to be zero when the absolute value $|\theta^{ref}_{ope}|$ of the angle $\theta^{ref}_{ope}$ is greater than a predetermined angular range D ($|\theta^{ref}_{ope}| \geq \theta_c$). (a) of FIG. 20 shows an exemplary setting of the upper limit Y of the assisting movement velocity $V_a$ in the case where the angle $\theta^{ref}_{ope}$ between the reference direction (=the positive direction of the $X_w$-axis of the electric wheel chair coordinate system $\Sigma_w$) and the direction of the target movement velocity $V_{ope}$ is zero.

Figure 20:
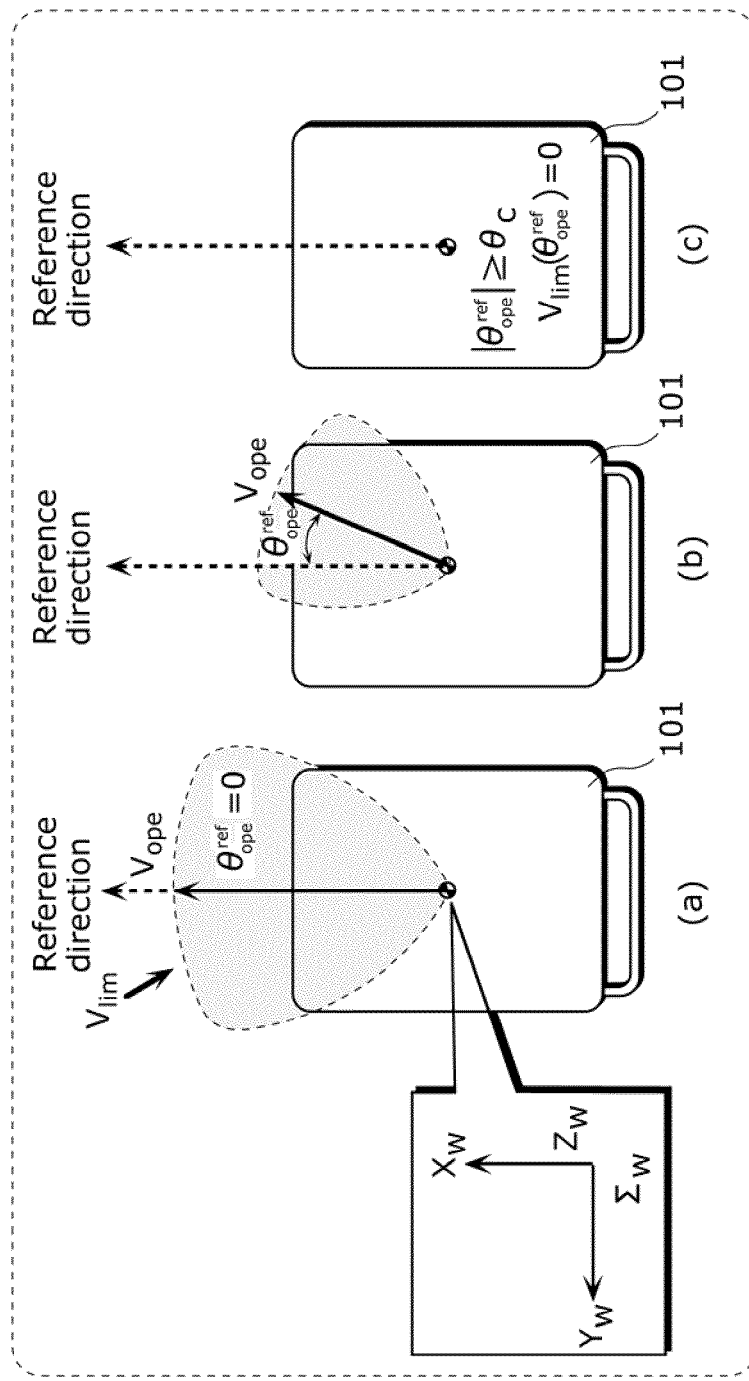
FIG. 20 shows an upper limit (5) to assisting force of the electric wheelchair 101 according to Embodiment 2.

(b) of FIG. 20 shows an exemplary setting of the upper limit Y of the assisting movement velocity $V_a$ in the case where the absolute value $|\theta^{ref}_{ope}|$ of the angle $\theta^{ref}_{ope}$ between the reference direction (=the positive direction of the $X_w$-axis of the electric wheel chair coordinate system $\Sigma_w$) and the direction of the target movement velocity $V_{ope}$ is within the predetermined angular range D ($|\theta^{ref}_{ope}| \geq \theta_c$).

(c) of FIG. 20 shows an exemplary setting of the upper limit Y of the assisting movement velocity $V_a$ in the case where the absolute value $|\theta^{ref}_{ope}|$ of the angle $\theta^{ref}_{ope}$ between the reference direction (=the positive direction of the $X_w$-axis of the electric wheel chair coordinate system $\Sigma_w$) and the direction of the target movement velocity $V_{ope}$ is greater than the predetermined angular range D ($|\theta^{ref}_{ope}| \geq \theta_C$).

In Embodiment 2, $\theta_C$, which defines the angular range D, assumed to be provided with a specific value of 45°. In this case, $k_2 (\theta^{ref}_{ope})$ is set to decrease from 1 with an increase in the absolute value $|\theta^{ref}_{ope}|$ of the angle $\theta^{ref}_{ope}$ between the reference direction (=a positive direction of the $X_w$-axis of the electric wheel chair coordinate system $\Sigma_w$) and the direction of the target movement velocity $V_{ope}$, and set to be zero when the absolute value $|\theta^{ref}_{ope}|$ of the angle $\theta^{ref}_{ope}$ is greater than the predetermined angular range D ($|\theta^{ref}_{ope}| \geq 45°$).

Setting the upper limit Y of the assisting movement velocity $V_a$ in this manner makes it easy to move the electric wheelchair 101 in a direction set by the operator (or a direction in which the operator may view with ease so that the operator may safely move the electric wheelchair 101) ($|\theta^{ref}_{ope}| < 45°$), and makes it difficult to move the electric wheelchair 101 in a direction set by the operator (or a direction in which the operator may not view with ease so that the operator may not safely move the electric wheelchair 101) ($|\theta^{ref}_{ope}| \geq 45°$. The electric wheelchair 101 is thus configured as an electric vehicle operable with increased safety.

Figure 21:
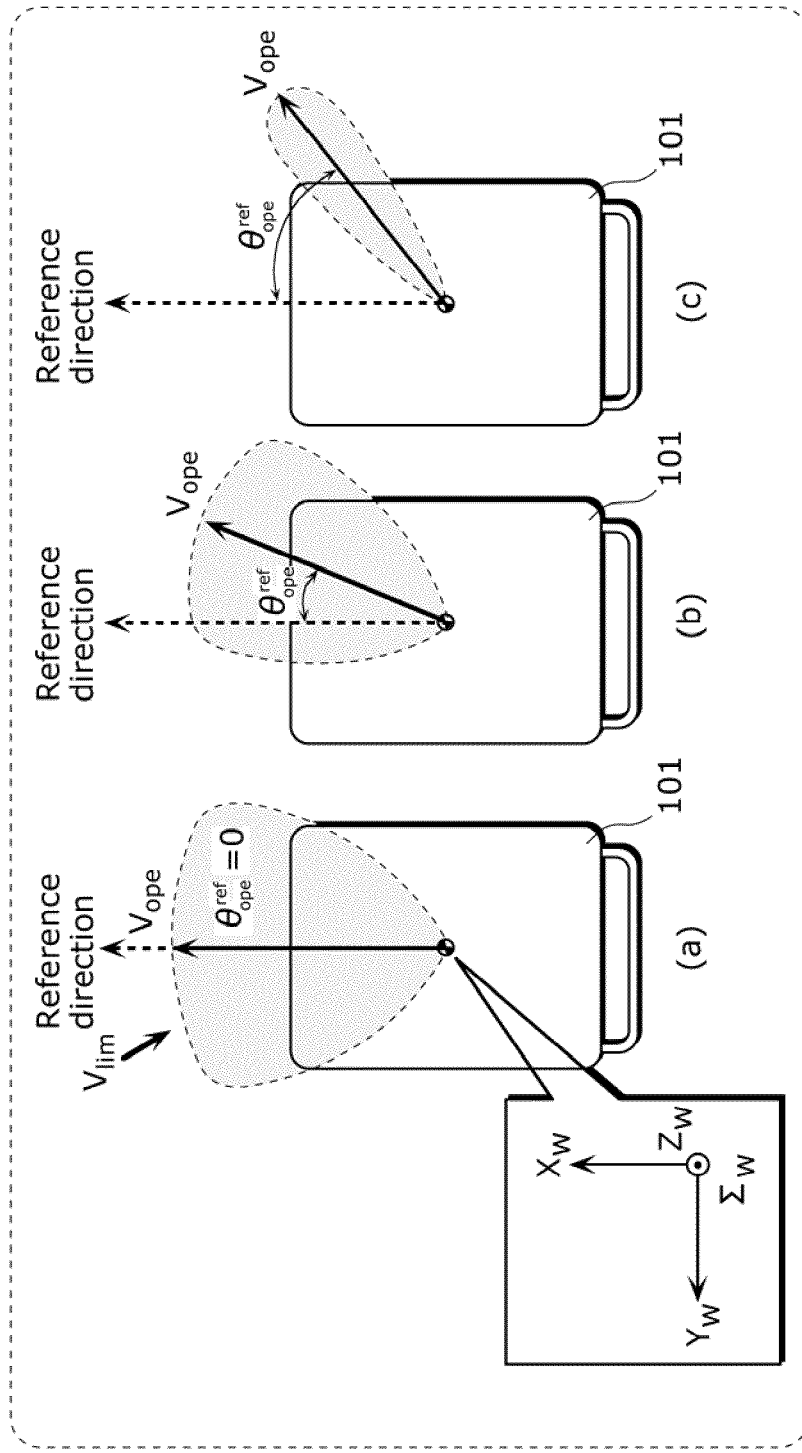
FIG. 21 shows an upper limit (6) to assisting force of the electric wheelchair 101 according to Embodiment 2.

Optionally, as shown in (a) to (c) of FIG. 21, $\theta^+_A$, $\theta^-_A$, $\theta^+_B$, and $\theta^-_B$ may be decreased with an increase in the absolute value $|\theta^{ref}_{ope}|$ of the angle $\theta^{ref}_{ope}$ between the reference direction (=the positive direction of the $X_w$-axis of the electric wheel chair coordinate system $\Sigma_w$) and the direction of the target movement velocity $V_{ope}$, where $k_2(\theta^{ref}_{ope})=1$.

(a) of FIG. 21 shows an exemplary setting of the upper limit Y of the assisting movement velocity $V_a$ in the case where the angle $\theta^{ref}_{ope}$ between the reference direction (=the positive direction of the $X_w$-axis of the electric wheel chair coordinate system $\Sigma_w$) and the direction of the target movement velocity $V_{ope}$ is zero.

(b) of FIG. 21 shows an exemplary setting of the upper limit Y of the assisting movement velocity $V_a$ in the case where the absolute value $|\theta^{ref}_{ope}|$ of the angle $\theta^{ref}_{ope}$ between the reference direction (=the positive direction of the $X_w$-axis of the electric wheel chair coordinate system $\Sigma_w$) and the direction of the target movement velocity $V_{ope}$ is a value other than zero.

(c) of FIG. 21 shows an exemplary setting of the upper limit Y of the assisting movement velocity $V_a$ in the case where the absolute value $|\theta^{ref}_{ope}|$ of the angle $\theta^{ref}_{ope}$ between the reference direction (=the positive direction of the $X_w$-axis of the electric wheel chair coordinate system $\Sigma_w$) and the direction of the target movement velocity $V_{ope}$ is greater than the absolute value $|\theta^{ref}_{ope}|$ shown in (b) of FIG. 21.

Setting the upper limit Y of the assisting force $F_a$ in this manner also makes it easy for to move the electric wheelchair 101 in a direction set by the operator (or a direction in which the operator may view with ease so that the operator may safely move the electric wheelchair 101), and makes it difficult to move the electric wheelchair 101 in a direction set by the operator (or a direction in which the operator may not view with ease so that the operator may not safely move the electric wheelchair 101). The electric wheelchair 101 is thus configured as an electric vehicle operable with increased safety.

The operator may set one or more reference directions in addition to the reference direction (=the positive direction of the $X_w$-axis of the electric wheel chair coordinate system $\Sigma_w$). For example, when there are two directions in which the operator may easily move the electric wheelchair 101 (or directions in which the operator may view with ease so that the operator may safely move the electric wheelchair 101), the two directions may be set as reference directions. In the case of the independent two-wheel drive configuration, for example, two directions perpendicular to the axle (forward and backward directions) are set as reference directions. In this case, since the electric wheelchair 101 may be easily moved in the set two directions (forward and backward directions) due to its structure, assisting movements in the directions may be set to be large and assisting movements in the other directions may be set to be small. As a result, a control system is simpler in configuration.

Figure 22:
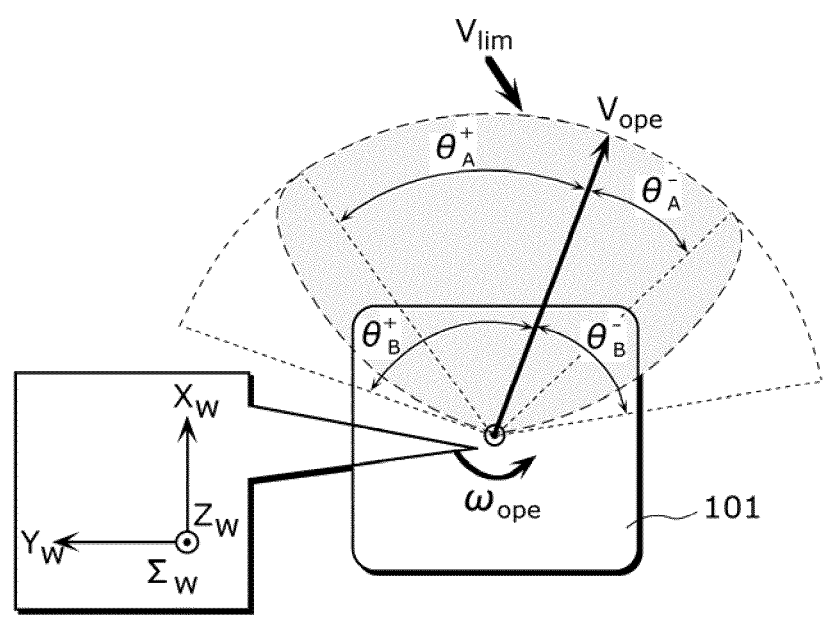
FIG. 22 shows an upper limit (7) to assisting force of the electric wheelchair 101 according to Embodiment 2.
Figure 23:
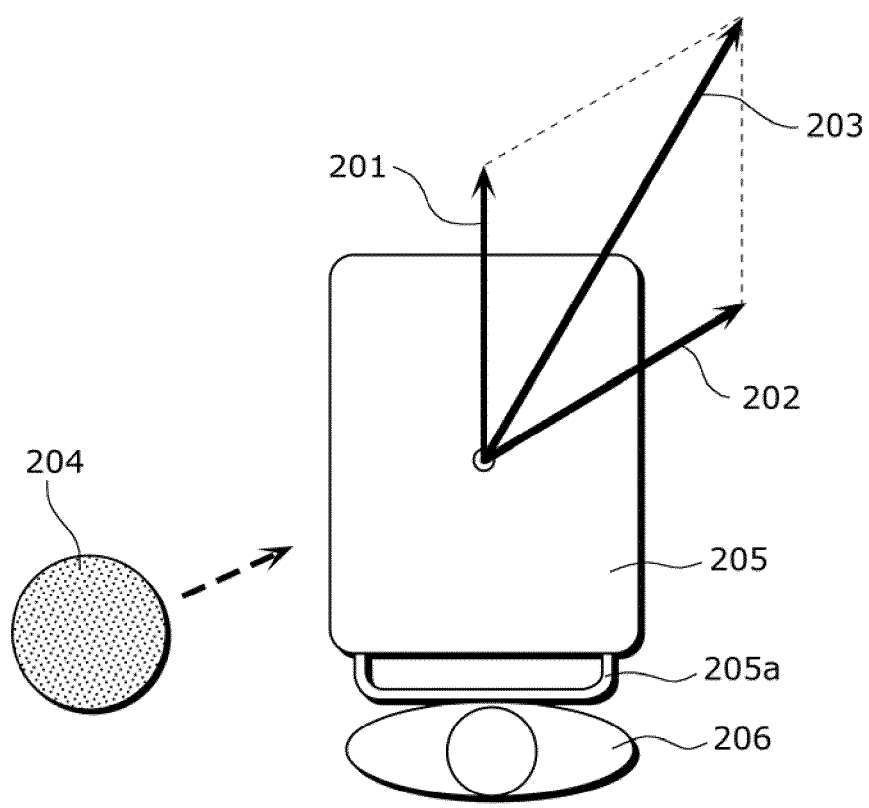
FIG. 23 shows a power assisted trolley using a conventional technique.
Figure 24:
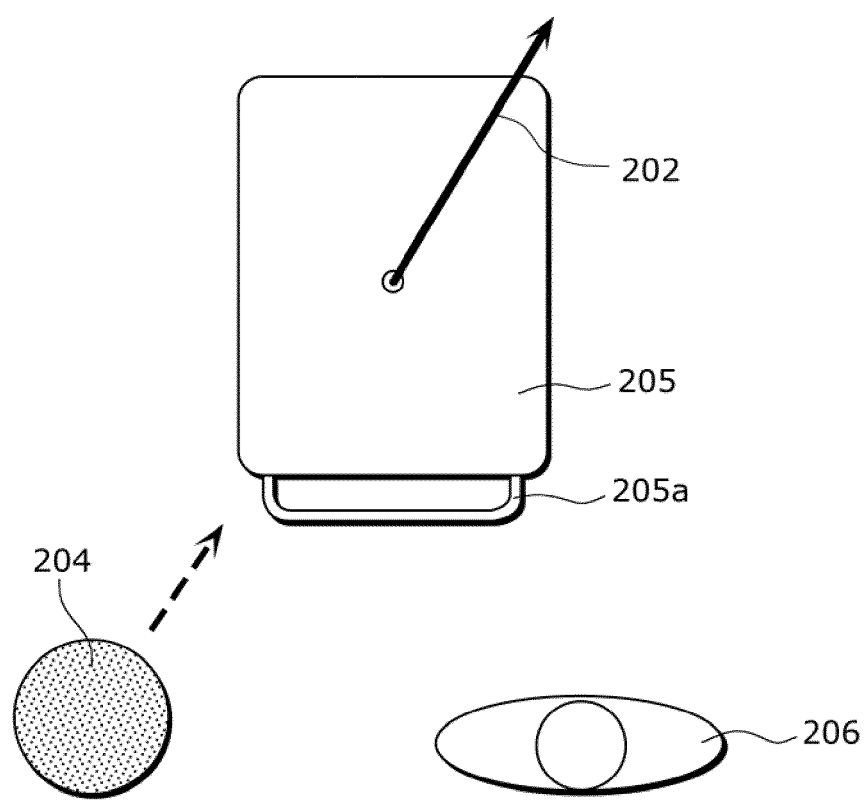
FIG. 24 shows a problem (1) of the conventional technique.
Figure 25:
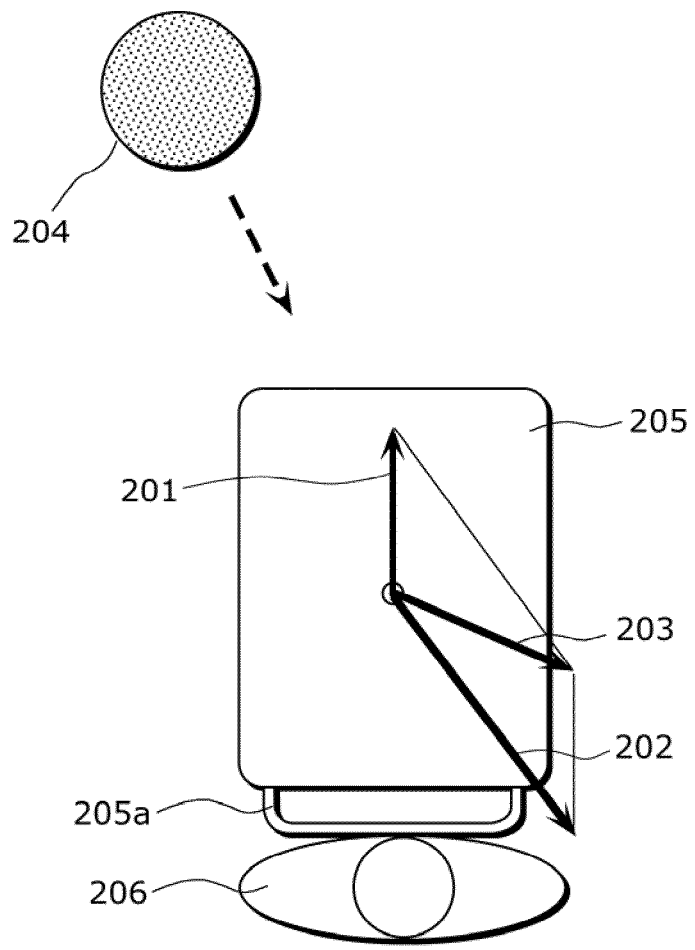
FIG. 25 shows a problem (2) of the conventional technique.

When not only a target velocity of a translational movement but also a target velocity of a rotational movement is simultaneously acting on the electric wheelchair 101 as the target movement velocity $V_{ope}$, $\theta^+_A$, $\theta^-_A$, $\theta^+_B$, and $\theta^-_B$ may be changed depending on the magnitude and direction of the applied velocity of a rotational movement. For example, when not only a target velocity of a translational movement but also a target velocity of a counterclockwise rotational movement is applied to the electric wheelchair 101 as the target movement velocity $V_{ope}$ as shown in FIG. 22, the values of $\theta^+_A$ and $\theta^+_B$ are increased in proportion to the magnitude of the target velocity of the rotational movement. In contrast, when not only a target velocity of a translational movement but also a target velocity of a clockwise rotational movement is applied to the electric wheelchair 101 as the target movement velocity $V_{ope}$, the values of $\theta^-_A$ and $\theta^-_B$ are increased in proportion to the magnitude of the target velocity of the rotational movement. In this configuration, when not only a target velocity of a translational movement but also a target velocity of a counterclockwise rotational movement is applied to the electric wheelchair 101 as the target movement velocity $V_{ope}$, setting in this manner allows the electric wheelchair 101 to move in the direction of the moment more easily, and thus operability of the electric wheelchair 101 is increased.

Thus, generation of an unexpected assisting movement velocity is prevented when the operator is not operating the electric wheelchair 101, and so is generation of an assisting movement velocity widely different from a control input provided by the operator in direction or magnitude. The electric wheelchair 101 is thus configured as an electric vehicle operable with enhanced safety.

Next, the drive controller unit 112 converts the assisting movement velocity $V_a$ of the electric wheelchair 101 calculated by the assisting movement velocity calculation unit 111 into a rotation speed of each of the wheels (Step S109).

Here, when $\Omega_a$ denotes the rotation speed of the wheel 105, a relational expression of (Eq. 29) holds between the assisting movement velocity $V_a$ of the electric wheelchair 101 and the rotation speed $\Omega_a$ of the wheel 105 in the case where the wheels are configured and disposed as shown in FIG. 13.

[Math. 29]

$$\begin{bmatrix} v_a^x \\ v_a^y \\ \omega_a \end{bmatrix} = \frac{\sqrt{2}\,r}{4} \begin{bmatrix} -1 & -1 & 0 & 0 \\ 0 & -1 & -1 & 0 \\ \frac{L_w+L_d}{2(L_w^2+L_d^2)} & \frac{L_w+L_d}{2(L_w^2+L_d^2)} & \frac{L_w+L_d}{2(L_w^2+L_d^2)} & \frac{L_w+L_d}{2(L_w^2+L_d^2)} \end{bmatrix} \begin{bmatrix} \omega_a^1 \\ \omega_a^2 \\ \omega_a^3 \\ \omega_a^4 \end{bmatrix} \quad \text{(Eq. 29)}$$

Here, as shown in FIG. 13, $L_w$ is half the distance between the right and left wheels 105, and $L_d$ is half the distance between the front and rear wheels 105, where $L_w \in R$, and $L_d \in R$. r is the radius of the wheel 105, where $r \in R$. (Eq. 29) may be transformed into (Eq. 30).

[Math. 30]

$$\begin{bmatrix} \omega_a^1 \\ \omega_a^2 \\ \omega_a^3 \\ \omega_a^4 \end{bmatrix} = \frac{1}{\sqrt{2}\,r} \begin{bmatrix} -1 & 1 & \frac{2(L_w^2+L_d^2)}{L_w+L_d} \\ -1 & -1 & \frac{2(L_w^2+L_d^2)}{L_w+L_d} \\ 1 & -1 & \frac{2(L_w^2+L_d^2)}{L_w+L_d} \\ 1 & 1 & \frac{2(L_w^2+L_d^2)}{L_w+L_d} \end{bmatrix} \begin{bmatrix} v_a^x \\ v_a^y \\ \omega_a \end{bmatrix} \quad \text{(Eq. 30)}$$

Therefore, receiving, as an input, the assisting movement velocity $V_a$ of the electric wheelchair 101 calculated by the assisting movement velocity calculation unit 111, the drive controller unit 112 calculates the rotation speed $\Omega_a$ of the wheel 105 using (Eq. 30). The wheel driving unit 106 performs the speed control such that the wheel 105 rotates according to the rotation speed of the wheel 105 calculated by the drive controller unit 112 and drives the wheel 105 to move the electric wheelchair 101 (Step S110).

The electric wheelchair 101 is thus moved on the basis of the control input provided to the joystick 104a by the operator.

The present invention is not limited to the above Embodiments. For example, in another embodiment of the present invention, the components described in the present description may be optionally combined. The present invention also includes variations of the embodiments conceived by those skilled in the art unless they depart from the spirit and scope of the present invention, that is, the wording in the claims.

INDUSTRIAL APPLICABILITY

As described above, the present invention enables safer operation of an electric vehicle, preventing unexpected movement of the electric vehicle when not operated by an operator or occurrence of power assist which causes the electric vehicle to make a movement widely different from a movement intended by an operator in direction or magnitude. The present invention is therefore applicable to electric vehicles such as power assisted trolleys, electric wheelchairs, and shopping carts which move according to operations by operators.

REFERENCE SIGNS LIST

1 Power assisted trolley
2 Platform
3 Handle
4 Operating force measurement unit
4a Triaxial force sensor
5 Wheel
6 Wheel driving unit
6a Reducer
6b Electric motor
6c Encoder
6d Servo driver
7 Controller
8 Obstacle measurement unit
8a Laser range sensor
9 Virtual repulsive force calculation unit
10 Assisting force calculation unit
11 Assisting movement calculation unit
12 Drive controller unit
13 Operator
14 Obstacle
15 Power assisted cart
101 Electric wheelchair
102 Seat unit
103a Right armrest
103b Left armrest
104 Control input measurement unit
104a Joystick
105 Wheel
106 Wheel driving unit
106a Reducer
106b Electric motor
106c Encoder
106d Servo driver
107 Controller
108 Obstacle measurement unit
108a Laser range sensor
109 Obstacle avoidance velocity calculation unit
110 Target movement velocity calculation unit
111 Assisting movement velocity calculation unit
112 Drive controller unit
201 Operating force
202 Virtual repulsive force
203 Resultant force
204 Obstacle
205 Power assisted trolley
205a Handle unit
206 Operator

The invention claimed is:
1. An electric vehicle comprising:
a control input measurement unit configured to measure a magnitude and a direction of a control input provided by an operator to said electric vehicle;
an obstacle measurement unit configured to measure a position vector of an obstacle in relation to said electric vehicle as an origin;

a target movement velocity calculation unit configured to calculate a target movement velocity of said electric vehicle, the target movement velocity being based on the magnitude and direction of the control input measured by said control input measurement unit;

an obstacle avoidance velocity calculation unit configured to calculate, based on the position vector determined by said obstacle measurement unit, an obstacle avoidance velocity at which said electric vehicle is moved away from said obstacle; and an assisting movement velocity calculation unit configured to (i) calculate an assisting movement velocity for moving said electric vehicle based on a net velocity of the target movement velocity and the obstacle avoidance velocity, (ii) calculate an upper limit Y to a magnitude of the calculated assisting movement velocity based on the target movement velocity, (iii) and output information on an assisting movement velocity equal to or smaller than the upper limit Y when the calculated assisting movement velocity exceeds the upper limit;

wherein said assisting movement velocity calculation unit is configured to calculate the upper limit Y based on an angle between a direction of the target movement velocity and a direction of the net velocity.

2. The electric vehicle according to claim 1, wherein said assisting movement velocity calculation unit is configured to set a magnitude of the target movement velocity as the upper limit Y.

3. The electric vehicle according to claim 1, wherein said assisting movement velocity calculation unit is configured to calculate the upper limit Y such that the upper limit Y decreases as an angle between a direction of the target movement velocity and the direction of the net velocity increases.

4. The electric vehicle according to claim 1, wherein, when an angle $\theta^{ope}_{sum}$ between a direction of the target movement velocity and a direction of the net velocity is within a range of $60° > \theta^{ope}_{sum} > -60°$, said assisting movement velocity calculation unit is configured to set a magnitude of the target movement velocity as the upper limit Y.

5. The electric vehicle according to claim 1, wherein, when an angle $\theta^{ope}_{sum}$ between a direction of the target movement velocity and a direction of the net velocity is equal to or larger than 60° or equal to or smaller than −60°, said assisting movement velocity calculation unit is configured to set a magnitude of the upper limit Y to zero.

6. The electric vehicle according to claim 1, wherein said assisting movement velocity calculation unit is configured to calculate the upper limit Y such that the upper limit Y decreases as an angle between a direction of the target movement velocity and a direction I set for said electric vehicle increases.

7. The electric vehicle according to claim 1, wherein, when an angle between a direction of the target movement velocity and a direction I set for said electric vehicle is within a range between 0° and 45°, said assisting movement velocity calculation unit is configured to set a magnitude of the target movement velocity as the upper limit Y or leave the upper limit Y unchanged.

8. The electric vehicle according to claim 4, wherein, when the target movement velocity includes a rotational component, at least one of the angle $\theta^{ope}_{sum}$ and an angle $\theta^{ref}_{ope}$ between a direction of the target operation velocity and a direction I set for said electric vehicle is increased in a direction of the rotational component.

* * * * *